United States Patent [19]

Aoki et al.

[11] Patent Number: 5,072,244
[45] Date of Patent: Dec. 10, 1991

[54] SUPERPOSED IMAGE FORMING APPARATUS WITH PLURAL AND ADJUSTABLE IMAGE FORMING STATIONS

[75] Inventors: Tomohiro Aoki, Yokohama; Kazuyoshi Chiku, Tokyo; Takashi Uchida; Kazunori Kanekura, both of Yokohama; Yasushi Murayama, Tokyo; Yoshihiko Hirose, Yokohama; Kunihiko Matsuzawa, Kawasaki, all of Japan

[73] Assignee: Canon Kabushiki Kaisha, Tokyo, Japan

[21] Appl. No.: 277,690

[22] Filed: Nov. 29, 1988

[30] Foreign Application Priority Data

| Nov. 30, 1987 | [JP] | Japan | 62-300001 |
| Nov. 30, 1987 | [JP] | Japan | 62-300005 |
| Nov. 30, 1987 | [JP] | Japan | 62-300009 |
| Nov. 30, 1987 | [JP] | Japan | 62-300011 |
| Nov. 30, 1987 | [JP] | Japan | 62-300012 |
| Mar. 31, 1988 | [JP] | Japan | 63-76378 |

[51] Int. Cl.$^5$ .................. G01D 15/14; G03G 21/00
[52] U.S. Cl. .................. 346/160; 355/202; 358/300
[58] Field of Search .................. 355/202, 326, 327; 346/157, 160; 358/298, 300

[56] References Cited

U.S. PATENT DOCUMENTS

| 4,615,612 | 10/1986 | Ohno et al. | 355/326 X |
| 4,803,515 | 2/1989 | Hoshino et al. | 355/327 X |
| 4,816,844 | 3/1989 | Uchida et al. | 346/160 |
| 4,903,067 | 2/1990 | Murayama et al. | 346/160 |
| 4,912,491 | 3/1990 | Hoshino et al. | 346/160 |
| 4,937,664 | 6/1990 | Chiku et al. | 355/327 X |

Primary Examiner—Fred L. Braun
Attorney, Agent, or Firm—Fitzpatrick, Cella, Harper & Scinto

[57] ABSTRACT

An image forming apparatus for forming superimposed images has a plurality of image holders each respectively for holding an image, a plurality of image forming stations for forming an image on the holders, and an adjusting device for adjusting positions of images formed on image holders except for that image station which is designated to be a standard station for adjusting or which is not used of image formation.

40 Claims, 35 Drawing Sheets

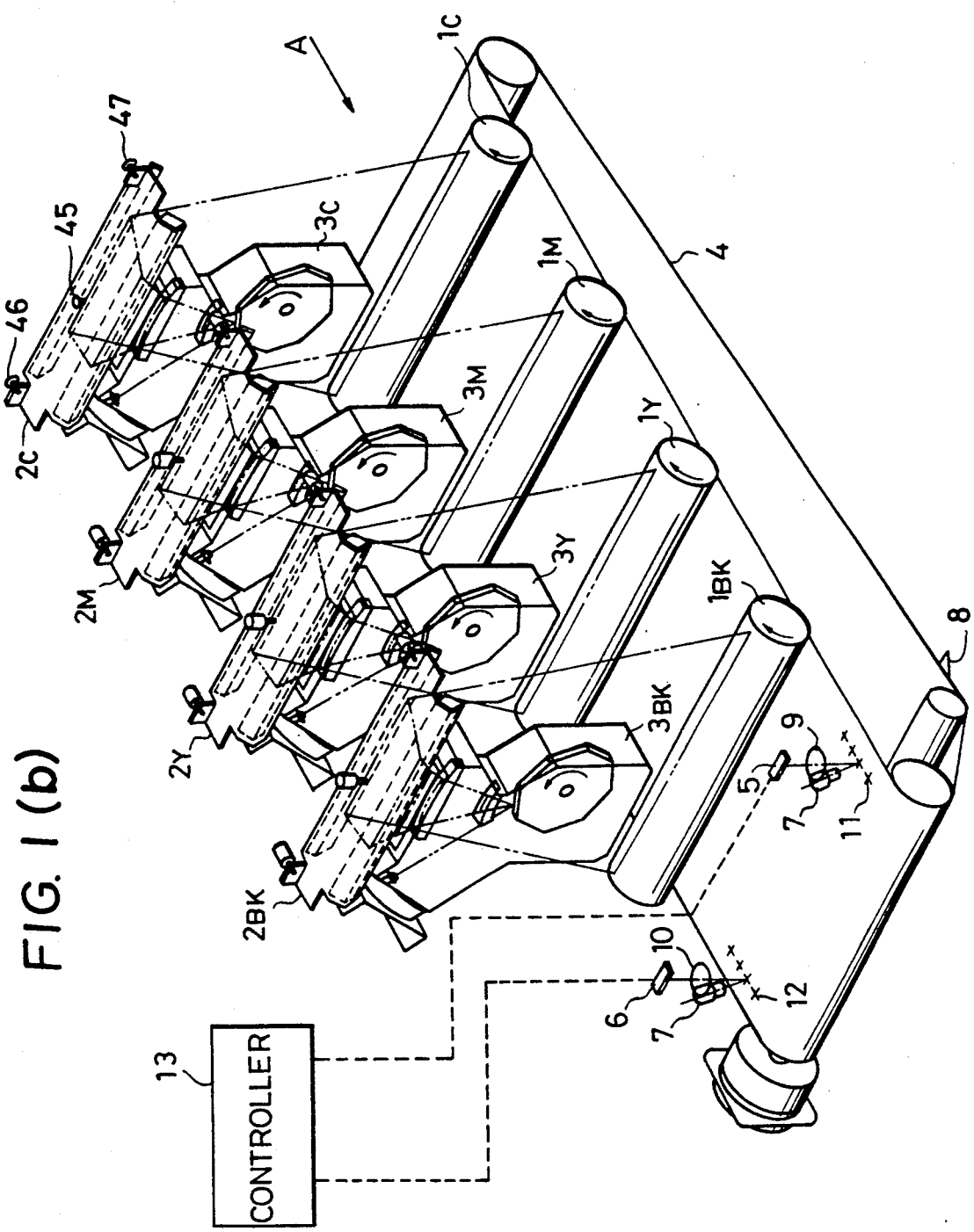
FIG. I(b)

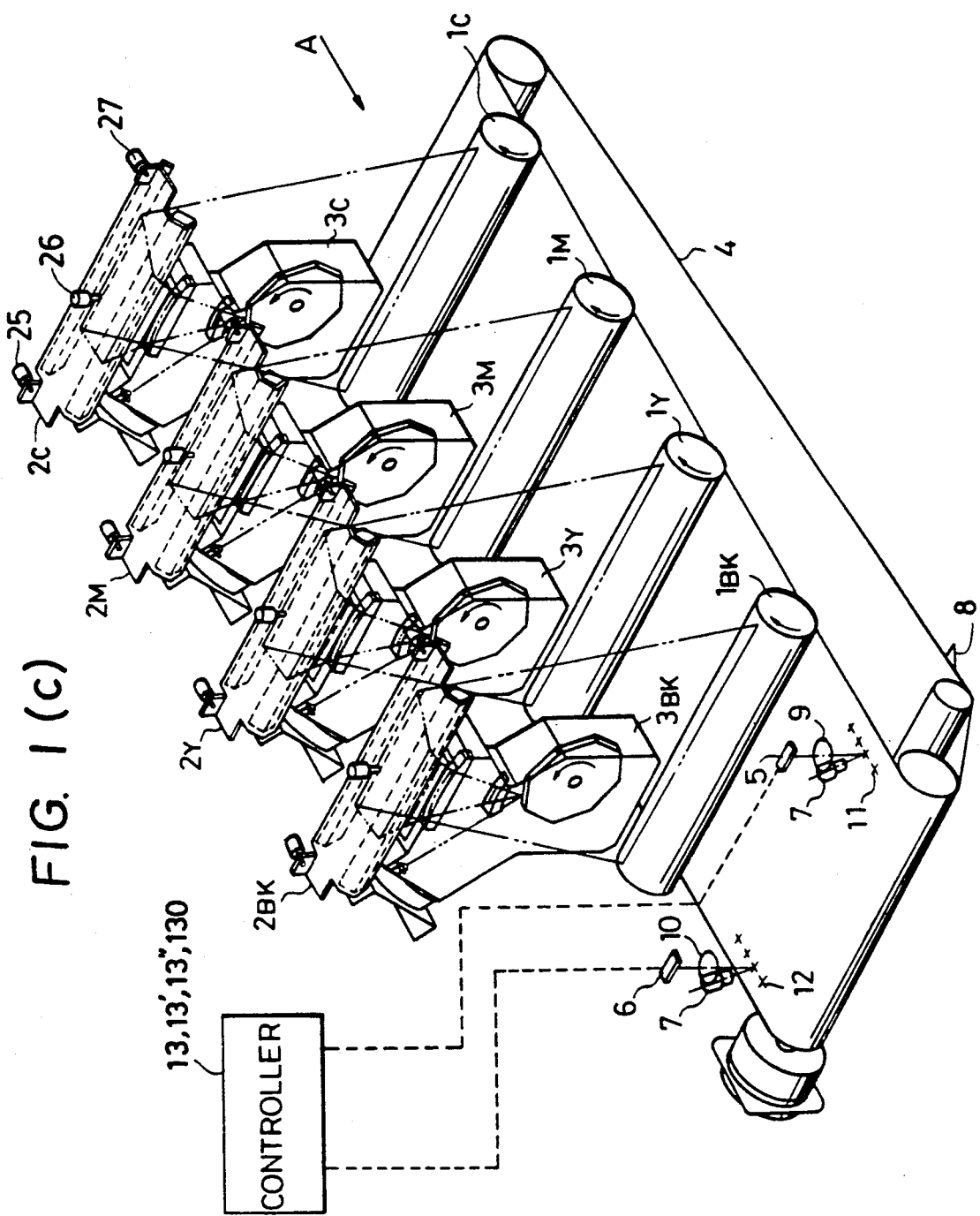

FIG. 6 (b2)

| FIG. 6 (b1) | FIG. 6 (b2) |

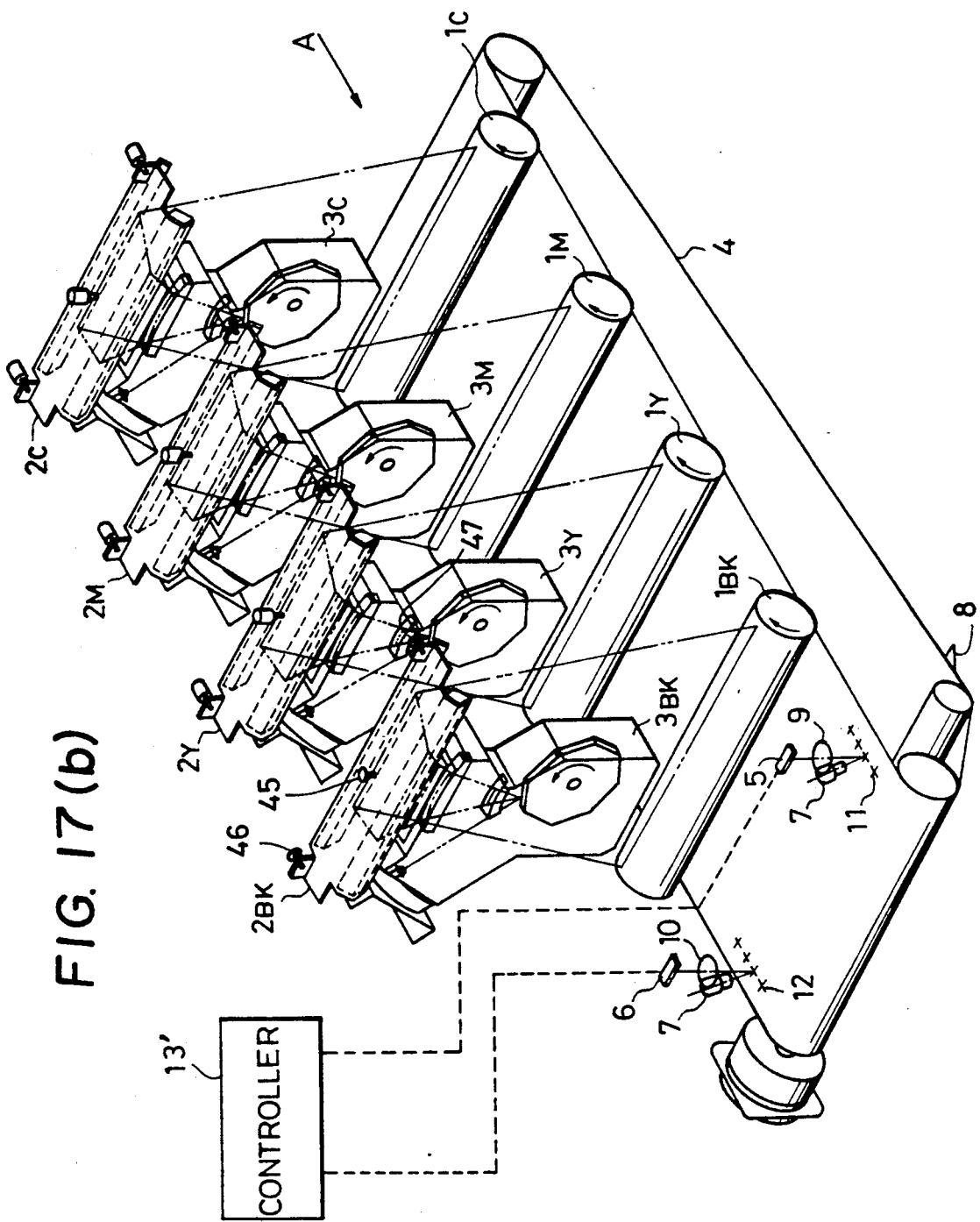

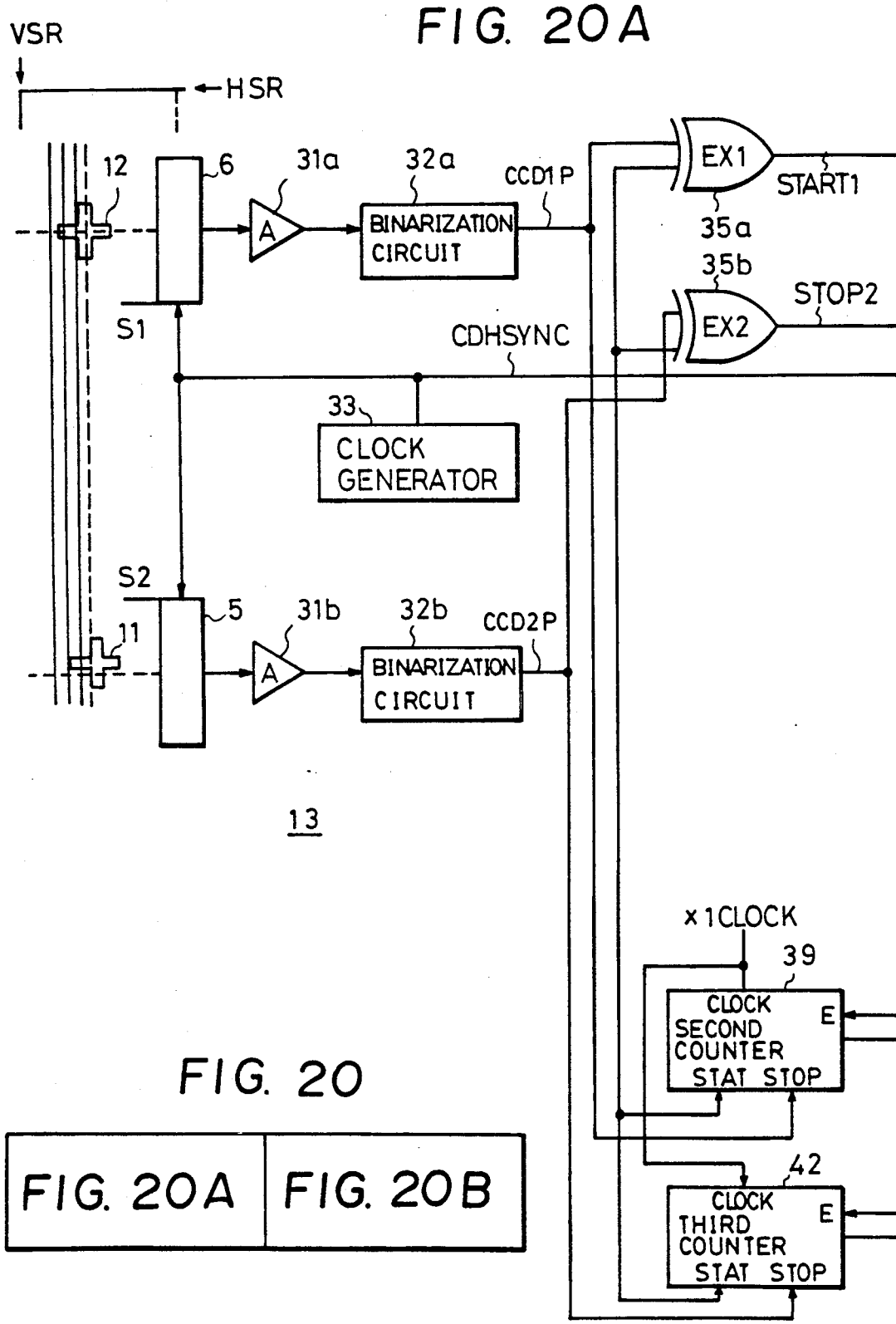

| FIG. 21A | FIG. 21B |

SUPERPOSED IMAGE FORMING APPARATUS WITH PLURAL AND ADJUSTABLE IMAGE FORMING STATIONS

BACKGROUND OF THE INVENTION

1. Field of the Invention

The present invention relates to an image forming apparatus, e.g. a copier, a facsimile device, or a printer for forming images on a transfer material, and specifically relates to an image forming apparatus for forming superimposed images.

2. Description of Related Information

Image forming apparatus which have a plurality of scanning units for scanning light images as shown in FIG. 11 are well known.

FIG. 11 is a cross sectional view of an image forming apparatus or color printer which has four drums to make full color images. This four drum type color printer has image forming stations 101C, 101M, 101Y and 101BK which respectively form color images, i.e., cyan, magenta, yellow and black images. These stations respectively have photosensitive drums 102C, 102M, 102Y and 102BK, optical scanning units 103C, 103M, 103Y and 103BK, chargers, developing units and cleaners, shown generally about the drums 102C, 102M, 102Y, and 102BK.

The four drum type color printer makes a cyan image, a magenta image, a yellow image and a black image on respective photosensitive drums. These images are sequentially transferred to a transfer material S which is transported along a direction A by a transportation belt 112. Thus, a plurality of color images are superimposed on the same surface of the same transferring material S. Therefore, if the transferred image position of each image forming station is shifted from a standard or correct position, different color images that should be superimposed relative to each other will not be resulting in false color images, and color hue would be different from the natural color hue in the case of natural full color images. Further misregistration can become so great that color misregistration is caused and the quality of image seriously deteriorates. As kinds of misregistrations, a misregistration in the transporting direction, a misregistration in the scanning direction, an inclination of scanning lines and an error of magnifications are known.

The misregistration in the transporting direction, which is called "a misregistration of top margin" in this specification thereafter, is apparent from FIG. 12(a). Namely, the top of the images in the transporting direction A of the transferring material S are misregistered with each other.

The misregistration of scanning direction, which is called "a misregistration of left margin" in this specification hereafter, is apparent from FIG. 12(b). Namely, the starting position of scanning of each color image is different from others thereof.

As shown in FIG. 12(c), the inclination of scanning line is caused by a difference of the angle which is the transporting direction of the transferring material S relative to the scanning line of each image forming station. And, as shown in FIG. 12(d), an error of magnification is caused by a difference between the magnifications of the scanning unit which is inherent from distances between the photosensitive drums and respective scanning mirrors.

Often, these four types of misregistrations do not happen independently, but happen simultaneously.

"The misregistration of top margin" is caused by a difference of the start timing of formation of images at the image stations 101C, 101M, 101Y and 101BK. "The misregistration of left margin" is caused by a difference of the start timing of scanning a the image stations 101C, 101M 101Y and 101BK.

The inclination of the scanning line is caused by inclination $\theta_1$ of the scanning components or by inclination angle $\theta_2$ between axes of the photosensitive drums 102C, 102M, 102Y and 102BK, as shown in FIG. 13 and FIG. 14 respectively. The error of magnifications is caused by a difference $\Delta L$ between the scanning location of the components 103C, 103M, 103Y and 103BK and the photosensitive drums 102C, 102M, 102Y and 102BK as shown in FIG. 15 and FIG. 16.

In order to remove these four kinds of misregistrations, a number of proposals have been made.

For example, "the misregistration of top margin" and "the misregistration of left margin" can be removed by adjusting the start timings of optical scanning operation electronically.

On the other hand, the inclination of the scanning line and the errors of magnifications can be removed by mechanically adjusting the components to remove positional errors arising during installation and errors in the angle of the optical scanning by the components 103C, 103M, 103Y and 103BK and the photosensitive drums 102C, 102M, 102Y and 102BK. Namely, such adjusting is achieved by adjusting positions and angles of the scanning components, the photosensitive drums and the mirrors in the optical paths between the scanning components and the photosensitive drums.

The misregistrations of top margin and left margin are generated according over time, but they can electronically be adjusted. However, it is very difficult to adjust the inclination of scanning lines and the errors of magnifications, which are caused by misplacement of the optical scanners, the photosensitive drums or the mirrors in the path between the optical scanners and the drums. One of reasons for this difficulty is inherent in the high precision of the system, e.g. a diameter of one picture element would be only 62 $\mu$m in the printer which has a resolution of 400 DPI (dot per inch). There are many other causes for generation of misregistrations, e.g., running states of the transferring belt (winding or inclining), replacement of the photosensitive drums, or movement of the machine. Also the timing signals for vertical synchronization and horizontal synchronization are so unstable that the misregistrations of the top margin and the left margin easily result.

Thus, after extended operating time of the system all kinds of misregistration take place. Therefore, it takes much time and much labor to adjust the system to reduce the misregistration. Further, adjustment equipment for all the image forming stations is necessary, so that cost of this type printer can become great.

Relative positions of a main body, optical systems, photosensitive drums 102C, 102M, 102Y and 102Bk and so on, adjusted when initially installed, may vary if the apparatus is moved from one place to another. Therefore, after movement of the apparatus, very complicated and difficult readjustment is required to prevent misregistration. Moreover, in such highly precise image forming apparatus, which does not compare with conventional image forming apparatus, variation in temperature also effects misregistration because of the thermal expansion and contraction of various components.

Adjustments of four misregistrations above mentioned must be performed on all image holding members or to all image forming stations. Therefore, it takes a long time to adjust the misregistrations. In particular, when the apparatus is operated in a monocolor mode, a two color mode or a triple color mode, there is at least one image forming station which is not used for an image formation. In spite of the non-use of this image forming station, registration marks of the non used station should be transferred and read, and the non-used station should be adjusted as well as in the full color mode. But such procedure is very wasteful. Therefore, time for adjusting in a one color mode can take as long as in a full color mode. Accordingly, efficiency of printing operation decreases. And the useful life of parts in the non used station, including the photosensitive drum, are shortened.

SUMMARY OF THE INVENTION

It is an object of the present invention to overcome the above mentioned shortcomings of the conventional image forming apparatus for producing superimposed images. In accordance with the present invention, an image forming apparatus for forming superimposed images obtains high quality superimposed image without misregistrations.

In one aspect of the present invention, an image forming apparatus for forming superimposed images comprises a plurality of image holders each respectively for holding an image, a plurality of image forming means each respectively for forming an image on each of the image holders, a moving member for assisting in transfer of the images formed on the image holders, and adjusting means for adjusting positions of images formed on the image holders except for the image holder most downstream relative to the moving member.

In another aspect, an image forming apparatus for forming superimposed images comprises more than three image holders each respectively for holding an image, a plurality of image forming means each respectively for forming an image on each image holder, a moving member for assisting in transfer of the image formed on the image holders, and adjusting means for adjusting positions of images on the image holders except for the one image holder which is neither positioned in most upstream nor downstream position relative to the moving member based on a position on the image on the one image holder.

In another aspect of the present invention, an image forming apparatus for forming superimposed images comprises a plurality of image holders each respectively for holding an image, a moving member for assisting in transfer of the images formed on the image holders, with the moving member having a region for receiving a recorded registration mark, a detector for detecting the registration mark and for producing a detection signal, and adjusting means for defining a permissible extent for detecting the registration mark and adjusting positions of the images on the image holders in accordance with the detection signal when the detection signal is produced within the permissible extent.

Further, in another aspect of the present invention, an image forming apparatus for forming superimposed images comprises a plurality of image holders each respectively for holding an image, a plurality of image forming means each respectively for forming an image on one of the image holders, wherein the plurality of image forming means can be selectively used, and adjusting means for adjusting positions of images on the image holders which correspond to the selected image forming means in accordance with the selected image forming means.

The foregoing summary of certain more important features of the invention is provided in order that the detailed description of the preferred embodiments thereof that follows may be better understood, and in order that the present contribution to the art may be better appreciated. There are, of course, additional features of the invention that will be described in that detailed description with reference to the accompanying drawing. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

BRIEF DESCRIPTION OF THE DRAWINGS

FIG. 1(b) is a perspective view of a modification of the first embodiment.

FIG. 1(c) is a perspective view of a modification of the first and second embodiments.

FIG. 17(b) is a perspective view showing a modified from of the embodiment of FIG. 17(a).

FIG. 20, comprising FIGS. 20A and 20B, is a block diagram of a controller in used in the embodiment of FIG. 19(a).

DETAILED DESCRIPTION OF THE PREFERRED EMBODIMENTS

Figure 1A:
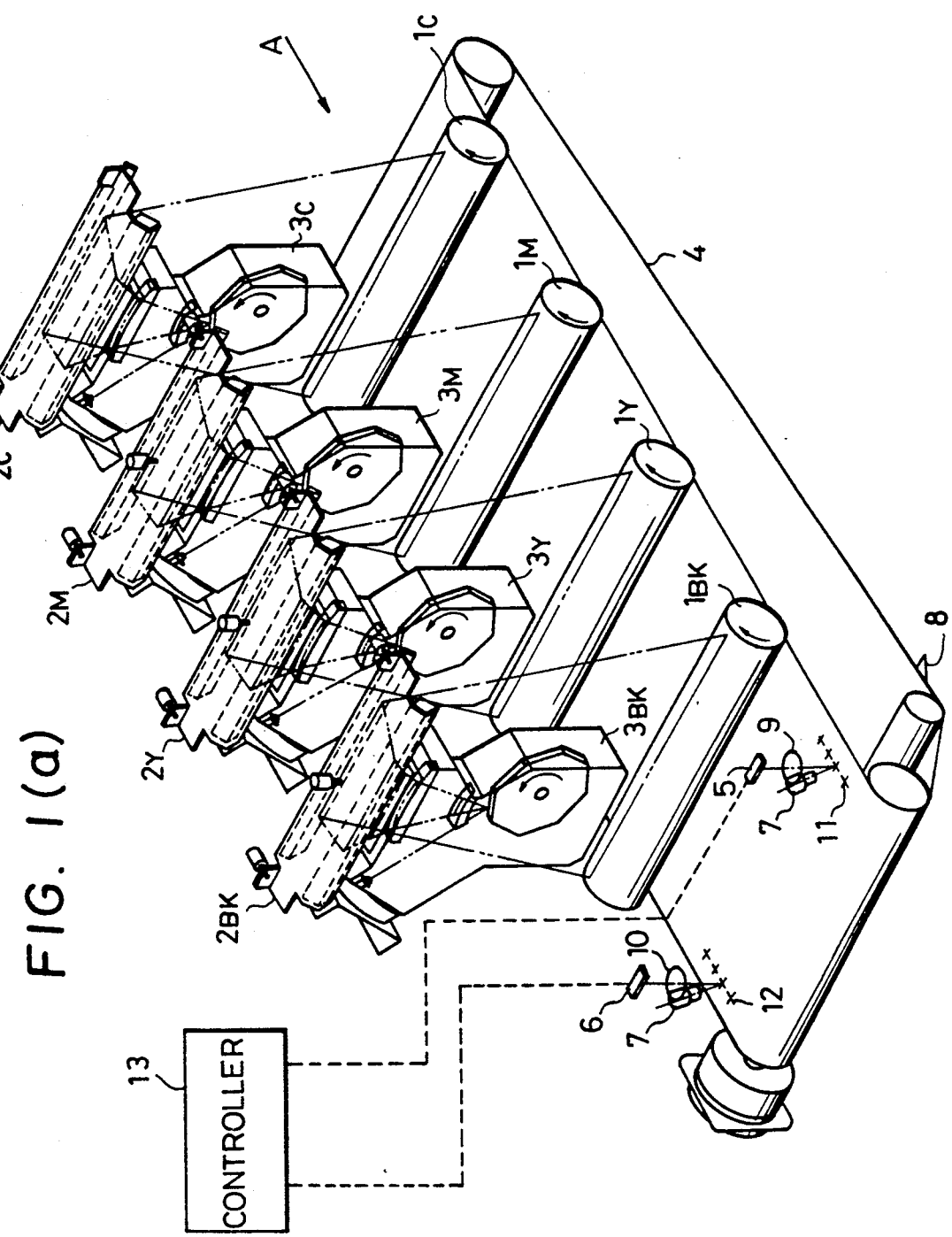
FIG. 1(a) is a perspective view of a four drum full color image forming apparatus of a first embodiment of the present invention.

FIG. 1(a) is a perspective view of a four drum type full color image forming apparatus in accordance with a first embodiment of the present invention. The apparatus includes four image forming stations, namely, cyan, magenta, yellow and black stations which respectively have photosensitive drums 1C, 1M, 1Y and 1BK. Around each of the photosensitive drums there is a charger, a developer for developing each color image with each color toner, and a cleaner, but for the sake of clarity these devices are omitted in FIG. 1(a).

The apparatus also has four optical scanning units 3C, 3M, 3Y and 3BK, each of which has a laser generator, a polygonal mirror, imaging lenses, and an optical mirror 2C, 2M, 2Y and 2BK, which corporate to image light on the surface of the photosensitive respective drums 1C, 1M, 1Y and 1BK. A transporting belt 4 is provided and carries registration marks 11 and 12 on the belt 4. The registration marks 11 and 12 are transferred in parallel to each other and in parallel to the transporting direction A.

In this embodiment, for the cyan image forming station, the photosensitive drum 1C, the optical mirror 2C and the optical scanner unit 3C are installed fixedly at the time of assembly and there no adjusting equipment, as explained later, in provided.

On the other hand, the other image forming stations have adjusting equipment for enabling movement of the photosensitive drums 1M, 1Y and 1BK, the optical mirrors 2M, 2Y and 2BK, and the optical scanner units 3M, 3Y and 3BK.

Mark detectors 5 and 6, which comprise opto-electrical imaging devices like CCDs, are provided for detecting the registration marks 11 and 12.

The registration marks 11 are lighted by a lamp 7 and light reflected from the marks 11 is detected by the mark detector 5 via a condenser lens 9. The mark detector 5 detects the registration marks 11, which comprise four "+" shaped colored marks, in synchronism with a detection timing signal generated from a controller 13.

Similarly, the registration marks 12 are lighted by a lamp 7, and light reflected from the marks 12 is detected by the mark detector 6 via a condenser lens 10. The mark detector 6 detects the registration marks 12, which comprise four "+" shaped four colored marks that are the same as the marks 11, in synchronism with a detection timing signal generated from the controller 13. Those output detecting signals from the detectors are input into the controller 13.

A cleaning unit 8 is provided for cleaning toner from the registration marks 11, 12.

The controller 13 detects differences between detection timing of the cyan registration mark and that of other colored registration marks. The controller 13 adjusts the optical path, the magnification and the inclination of scanning beam from the optical scanners 3M, 3Y and 3BK so as to cause the positions of scanning lines of magenta, yellow and black to concede with that of the cyan scanning line in accordance with the differences detected by the controller 13.

It will be explained below why the most upstream station in transporting direction of the transportation belt is selected as the standard station for the adjustment.

To correct the misregistration in response to positions of the registration marks, the standard marks formed by the standard station should be printed accurately, should be transferred accurately, and should be detected by detectors accurately. In a four drum color printer like that of the present embodiment, the transferring material S is sent to the printing station by a pair of registration rollers which are provided for synchronizing the top of the material with the top of the image on the drum at the transferring station.

Image writing on the photosensitive drums 1C, 1M, 1Y and 1BK starts based on the beginning of the rotation of the registration roller.

Therefore, the most upstream station, which is positioned closest to the registration rollers writes registration marks most precisely.

The farther from the registration rollers, the less the precision of the mark recording position because it takes significant time after the registration rollers start rotation until the station processes an image transferred thereto. Therefore, if the speed of the transportation belt 4 changes during this term, the transferring time of the registration marks change and it is impossible to write the registration marks on the predetermined positions.

In order to prevent these disadvantages or changing element, the standard registration marks should be formed by the most upstream station which is closest to the registration rollers (in this embodiment, the closest station is the cyan station).

The misregistrations are corrected based on the registration marks which are formed by the most upstream station and transferred on the transportation belt 4. Then ideal correction for the misregistrations can be carried out.

In the four drum color printer like the present embodiment, the images which are formed by the stations respectively are sequentially transferred to the transportation belt 4 and are transported downstream by the belt 4. Then, the registration marks which are transferred by the most upstream station are most precisely applied to the transportation belt 4, since the cyan marks are transported through contact parts between the transportation belt 4 and other drums 1M, 1Y and 1BK.

Thus, the cyan marks are more stable than other registration marks, and the detectors 5 and 6 detects most stably the cyan marks among the registration marks transferred on the transportation belt 4.

For these reasons described above, in this embodiment the standard registration marks are formed by the most upstream station which is the closest station to the registration rollers, and the standard marks are formed in the minimum elapsed time after the beginning of rotation of the registration rollers. The misregistrations are then corrected in accordance with the standard cyan registration marks.

Figure 2:
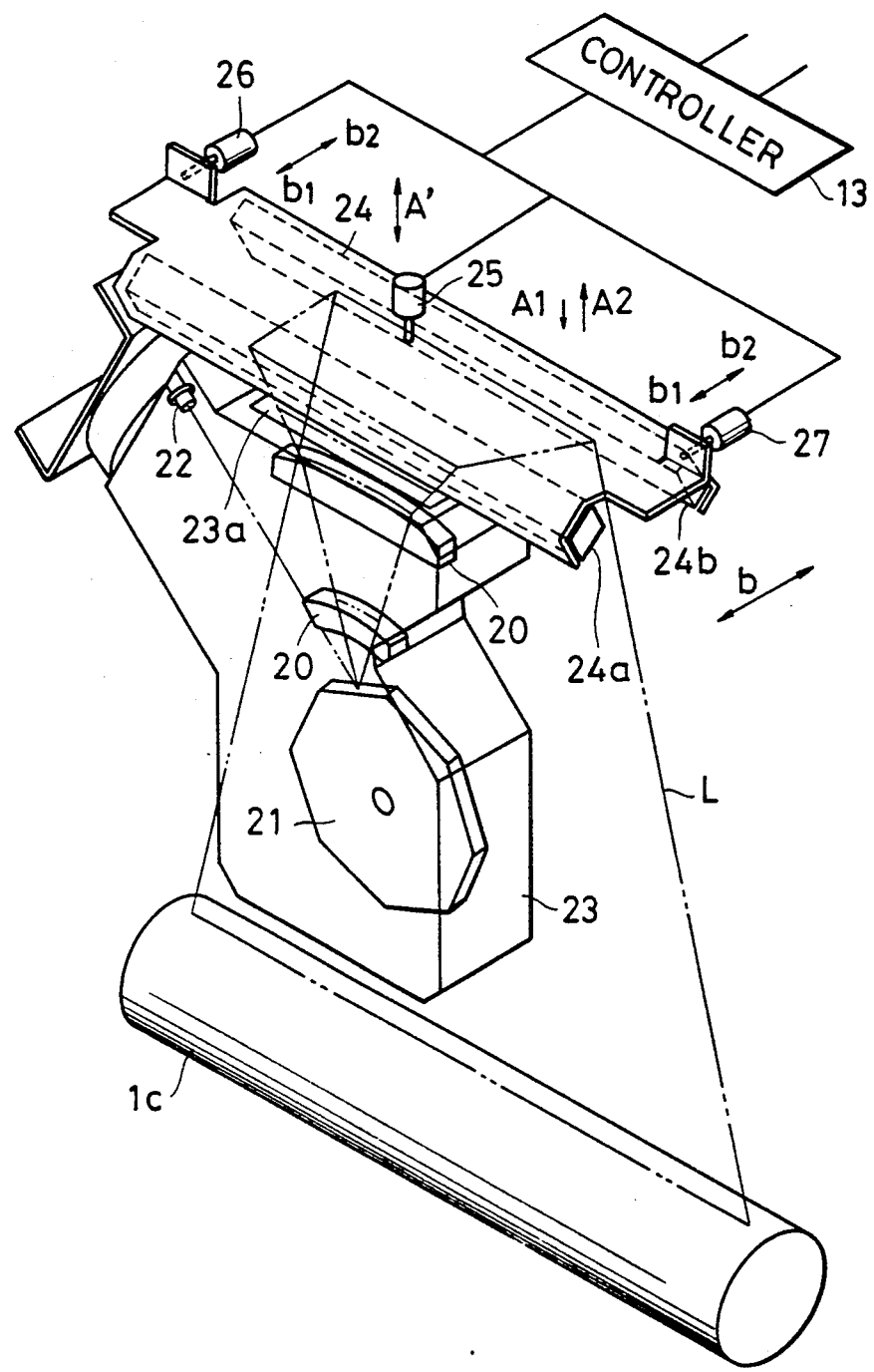
FIG. 2 is a perspective view showing an optical scanner of the embodiment FIG. 1(a).

FIG. 2 shows the basic structure of the optical scanner unit of the magenta, yellow and black station.

In FIG. 2, members which are same as those in FIG. 1(a) have the same identification numbers.

The optical scanner has a laser generator 22 for generating a laser beam L which is modified by an image signal, a polygonal mirror 21 for deflecting the laser beam L from the laser generator 22, an $F \cdot \theta$ lens 20 for imaging the laser beam L deflected by the polygonal mirror 21 onto the photosensitive drum 1 with the same speed and an optical box 23 for accommodating the laser generator 22, the polygonal mirror 21 and the $F \cdot \theta$ lens 20 in one united housing.

The laser beam L from the laser generator 22 is output from an aperture 23a via the $F \cdot \theta$ lens 20. A reflecting body 24 corresponding to the mirror 2M, 2Y or 2Bk comprises a first reflecting mirror 24a and a second reflecting mirror 24b which is substantially perpendicular to the first mirror 24a, thereby an inverted "V" shaped mirror is formed.

The laser beam L from the aperature 23a is reflected by the first and second mirrors 24a and 24b and is then imaged on the photosensitive drum 1.

A linear step actuator 25 comprising a stepping motor is provided for vertically moving in steps that reflecting body 24 which is equipped with the first and second mirrors 24a and 24b in a united body in a direction A1 or A2. Other linear step actuators 26 and 27 which also comprise stepping motors are provided for horizontally moving in steps the reflecting body 24 in a direction b.

The linear step actuators 25 through 27 have output axes that drive straight-line motion, and each of them has a motor rotor and the output axis which both have trapezoid screws. This type of actuator has been used as a driver for moving a reading/writing magnetic head of a magnetic disc reader/writer.

Of course, instead of this type of actuator other types of actuators can be used, for example, a stepping motor having an axial screw, which is called a lead-screw, and a movable member threaded onto the lead screw.

Correctly speaking, if the screw is 4P0.5 (diameter is 4 mm and pitch of thread is 0.5 mm) and one step angle is 1/48 of one rotation, an amount of advancing of one step SS is $0.5/48 = 10.42$ μm. Accordingly, the reflecting body 24 can be controlled to move every 10.42 μm.

Figure 3A:
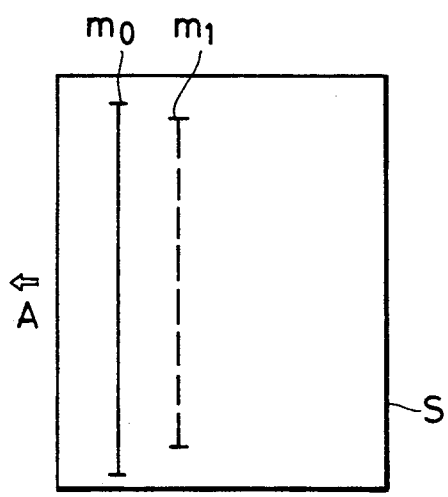
FIGS. 3(a) through 3 (c) are views explaining several kinds of misregistrations.
Figure 3B:
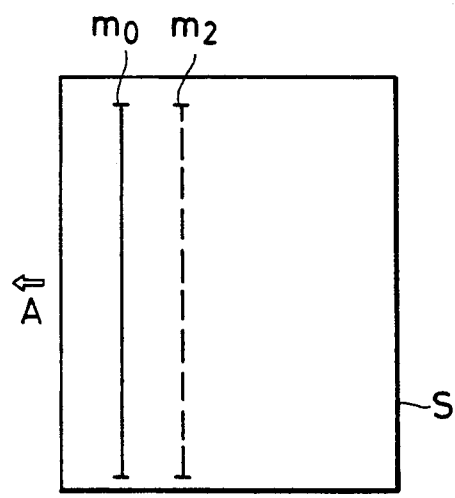
Figure 3C:
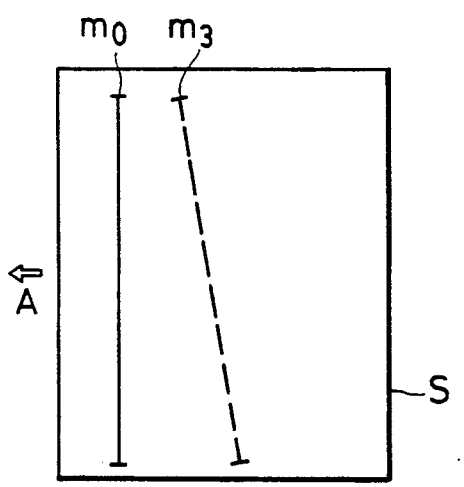

Driving operation of actuators 25 through 27 is explained as follows with reference to FIGS. 3(a) through (c) which are drawings for explaining misregistrations of images. In FIGS. 3(a) through (c), the transferring material S is transported in a direction A which is a transporting direction of the transporting belt 4. In FIG. 2, when the actuator 25 moves the reflecting body 24 in a direction A1, to bring the reflecting body 24 close to the optical box 23, the optical path from the polygonal mirror 21 to the photosensitive drum is shortened.

On the contrary, when the actuator 26 moves the reflecting body 24 in an opposite direction A2, the optical path is lengthened.

Thus, adjusting the length of the optical path causes the length $m_o$ (a solid line) of the scanning line of the light beam on the photosensitive drum can be changed to the length $m_1$ (a broken line) as shown in FIG. 3(a). When the actuators 25 and 27 are driven simultaneously and in the same direction, the reflecting body 24 is moved uniformly in a direction b perpendicular to the directions A1 and A2. Then the scanning line $m_o$ can be moved perpendicularly to the scanning line $m_2$ (broken line) as shown in FIG. 3(b). On the other hand, when one of the actuators 26 and 27 are driven, or both actuators 26 and 27 are driven in opposition to one another, for example, driven, the actuator 26 is driven in a direction b1 and the actuator 27 is driven in an opposite direction b2, the scanning line $m_o$ on the transferring material S can be inclined to the scanning line $m_3$ (broken line) as shown in FIG. 3(c). Thus, the length and the angle of the scanning line can be adjusted respectively and independently by this apparatus which includes the reflecting body 24 installed in the optical path between the polygonal mirror and the photosensitive drum, and actuators 25, 26 and 27 for moving the vertical position and the horizontal position and angle of the reflecting body.

In other words, when the reflecting body 24 having a pair of mirrors, which are shaped as an inverted "V" is moved in the direction Al, the length of the scanning line can be changed without changing the position of the scanning line on the photosensitive drum. And, when the reflecting body 24 is moved in the direction b, the imaging position on the photosensitive drum and the angle of the scanning line can be corrected without changing the length of the scanning line.

Figure 4A:
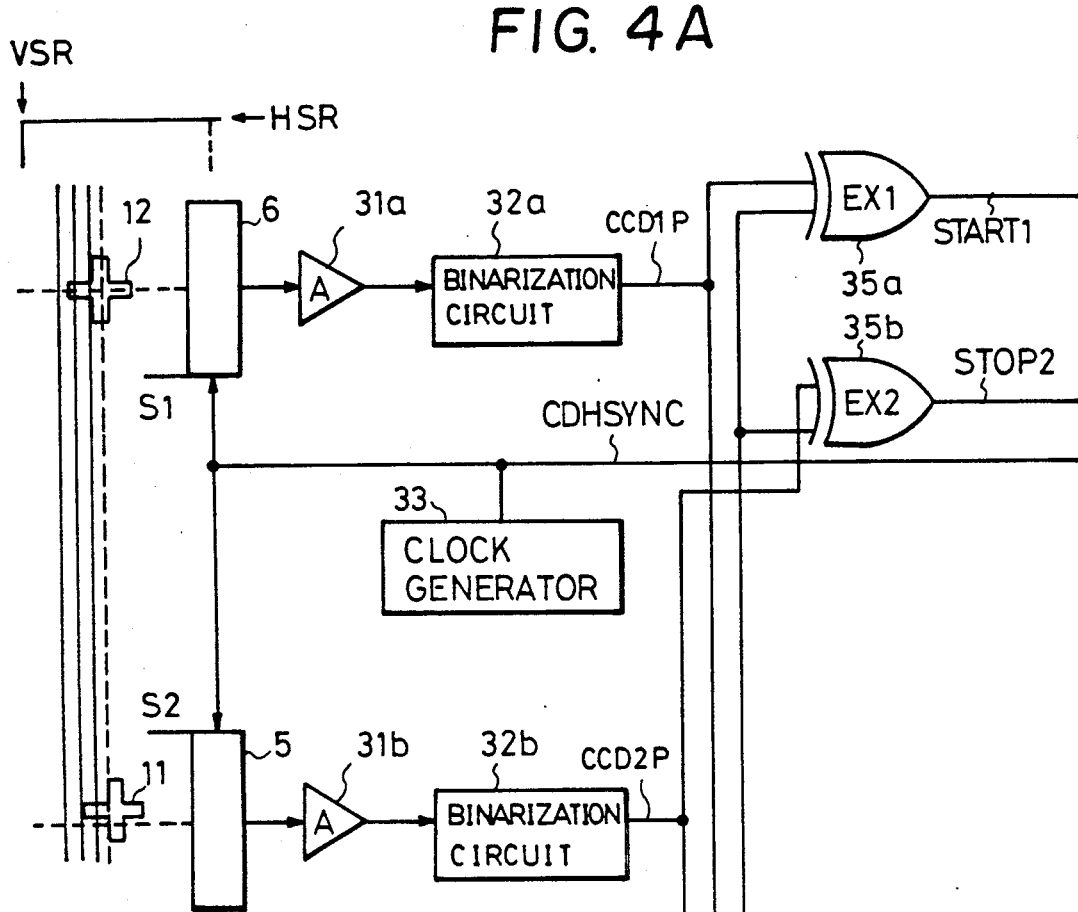
FIGS. 4A and 4B, is a block diagram showing the structure of a controller used in the embodiment of in FIG. 1(a).
Figure 4:
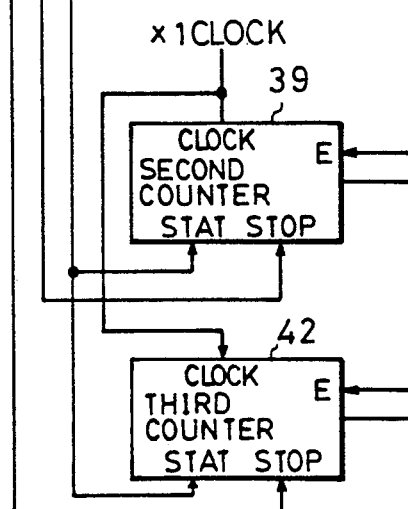
FIG. 4, comprising
Figure 4B:
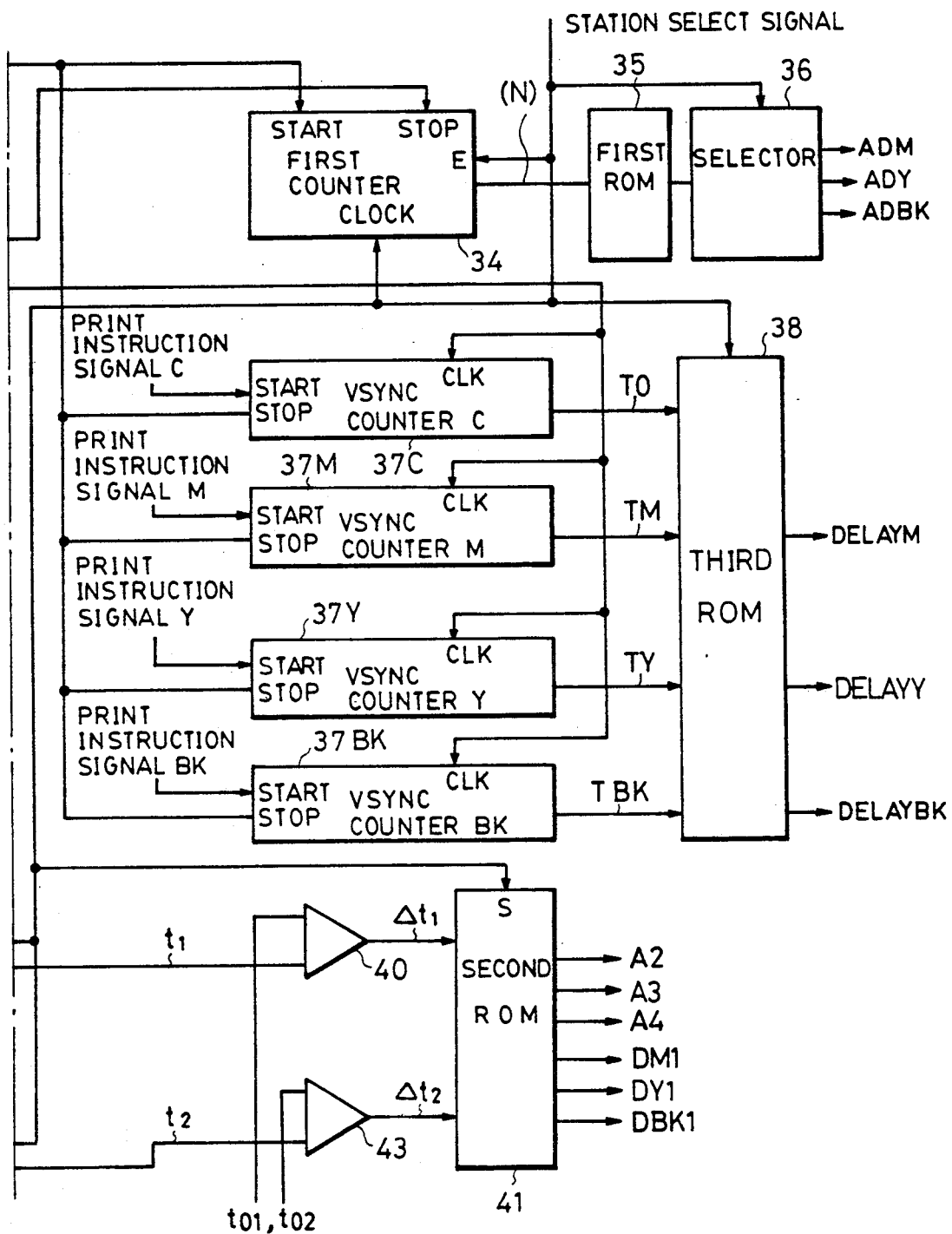

With reference to FIG. 4, an explanation will be provided of a system for reading the registration marks 11 and 12 for detecting of misregistrations and a feedback control operation for removing the misrepresentations in accordance with detected output signals.

FIG. 4 is a control block diagram showing components of the controller 13 in FIG. 1(a). The same members as in FIG. 1(a) have same identifying numbers.

In FIG. 4, an amplifier 31a is provided for amplifying a mark signal detected by the mark detector 6, and a binarization circuit 32a is also provided for binarizing the analog mark signal from the amplifier 31a to obtain binary mark signal CCD1P. The signal CCD1P is output to an exclusive OR gate 35a and a second counter circuit 39.

Similarly, an amplifier 31b is provided for amplifying a mark signal detected by the mark detector 5, and a binarization circuit 32b is also provided for binarizing the analog mark signal from the amplifier 31b to obtain a binary mark signal CCD2P. The signal CCD2P is output to an exclusive OR gate 35b and a third counter 42.

A clock generator 33 is provided for generating a main scanning synchronizing signal CDHSYNC which are used as a reading synchronizing signal for the mark detectors 5 and 6, and this signal CDHSYNC is supplied to clock input terminals of VSYNC counters 37C, 37M, 37Y and 37BK. By the way, the mark detectors are placed at predetermined positions according to the standard positions S1 and S2 such that if there is no misrepresentation of "top margin and left margin, no error of magnifications and no inclination of the scanning lines, it will be so indicated. The cyan registration marks 12 and 11 are formed accurate positions such that, the mark detectors 6 and 5 detect the centers of the marks 12 and 11 with their center imaging elements. Namely, because in this case the cyan station is standard, the reflecting body 24 and the optical box 23 of the cyan station is initially adjusted and fixed such that the mark detectors 6 and 5 can always detect the centers of the marks with their center imaging elements.

Thus, the mark detectors 6 and 5 can accurately detect the amount of the misrepresentations, that is, the difference between the cyan marks and other colored marks, magenta, yellow and black. And the controller 13 can accurately control the actuators 25 through 27 in accordance with the detected amount of the misrepresentations.

A first counter 34 is provided for counting the signal CDHSYNC between generation of a signal START1 and generation of a signal STOP2 and the count value of the signal CDHSYNC represents the inclination amount N of the scanning line.

Figure 6A:
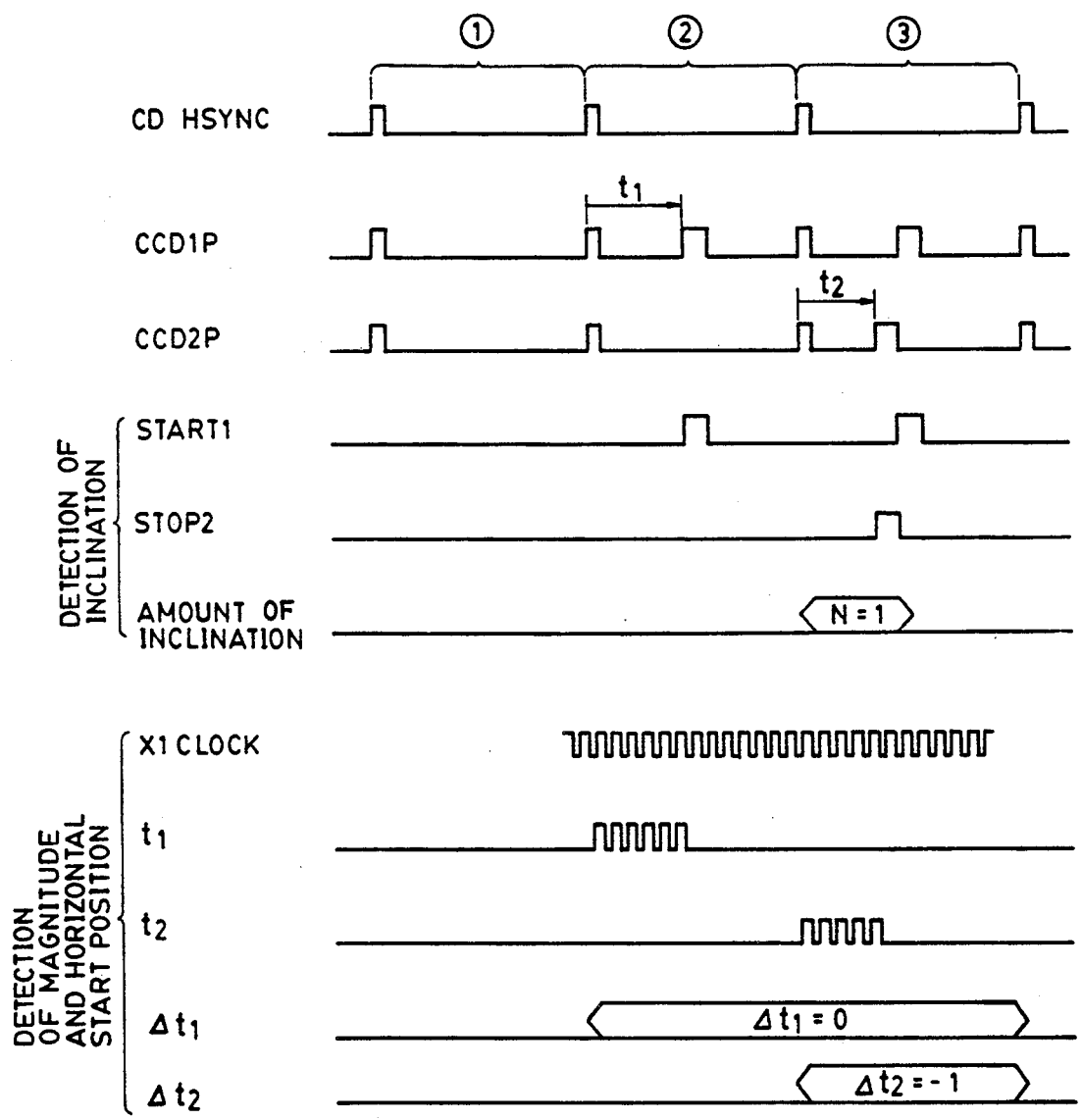
FIG. 6(a) is a timing-chart useful in explaining the operation of the controller in FIG. 4.
Figure 6:
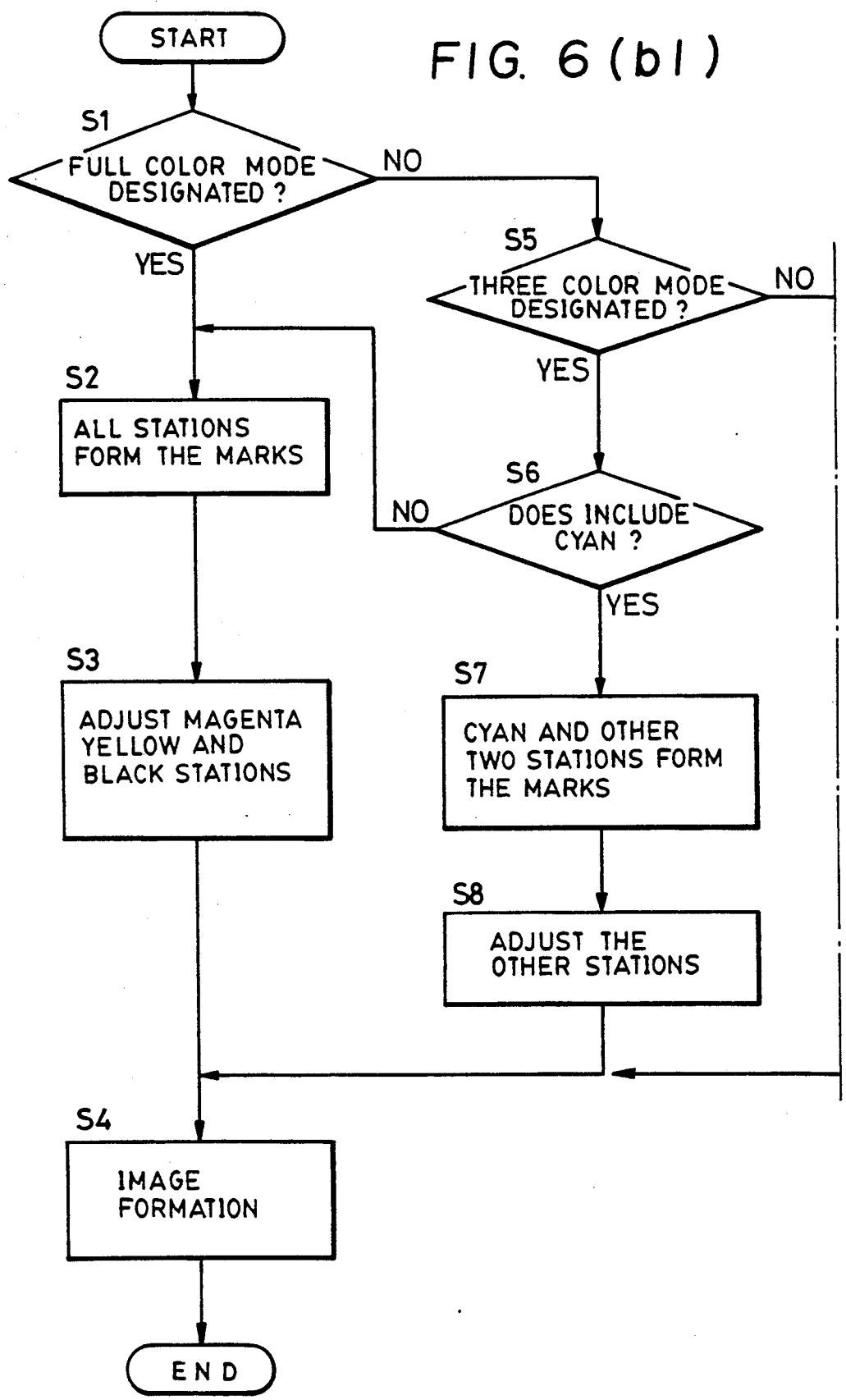
FIG. 6(b), comprising FIGS. 6(b1) and 6(b2), is a flow-chart showing a control operation in accordance with different color modes.
Figure 6:
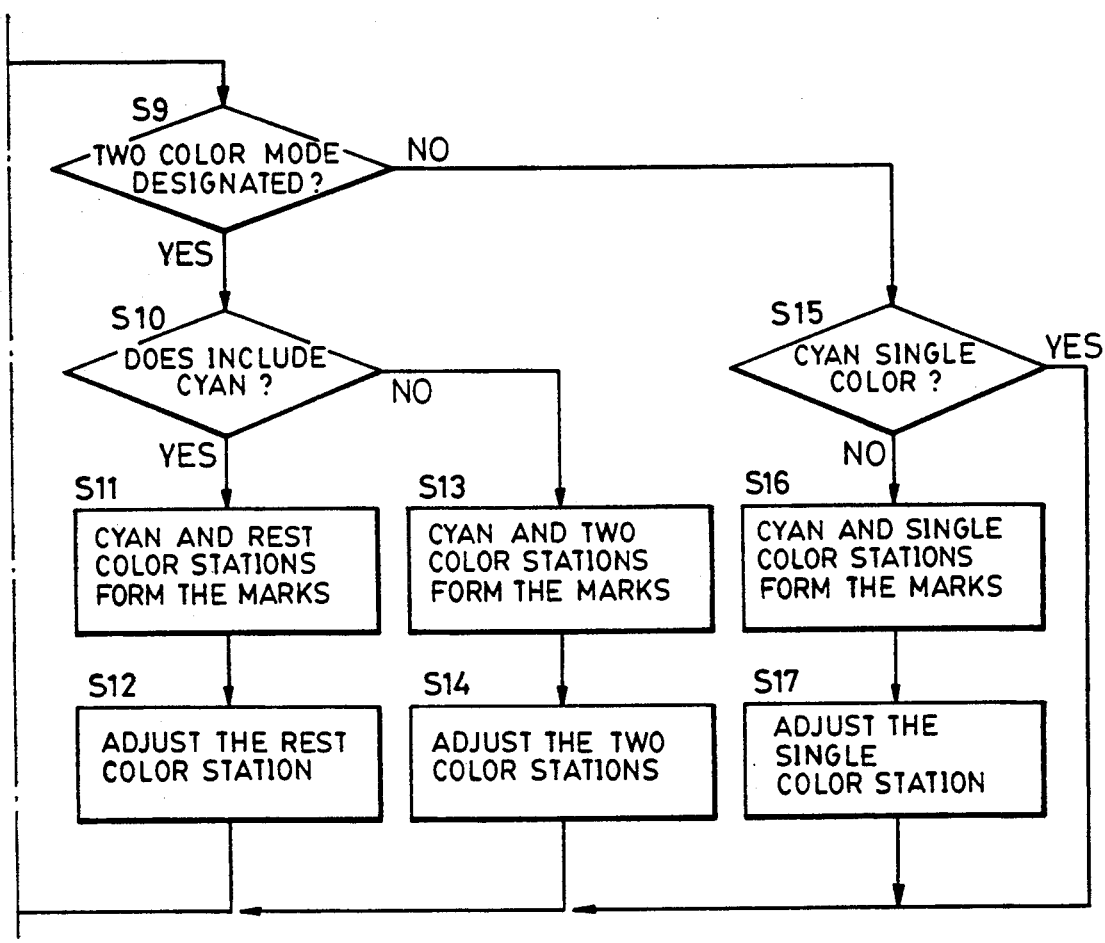

As shown in FIG. 6(a), the first counter 34 starts counting after the signal CCD1P for the cyan mark 12 is produced from the mark detector 6 is obtained during the horizontal scanning term 2 in synchronism with the signal START1 which is the result of exclusive OR operation on the signal CCD1P and the main scanning synchronizing signal CDHSYNC. The first counter 34 stops counting after the signal CCD2P for the cyan mark 11 is produced from the detector 5, in synchronism with the stop signal STOP2 which is a result of exclusive OR operation on the signal CCD2P and the signal CDHSYNC, during the horizontal scanning term 3.

The count value $N_o$ for the cyan marks becomes standard inclination data of the scanning line.

Then other inclination data $N_M$, $N_Y$ and $N_{Bk}$ for the magenta, yellow and black station are sequentially obtained. These inclination data are sequentially compared with the standard inclination data $N_o$, such that the amount of inclination is obtained for each of the magenta, yellow and black stations.

And the amount of inclination for the magenta, yellow and black stations is input to a first ROM35 as addresses data. The ROM35 stores control values for the actuators 26 and 27 in accordance with all the data of inclination.

A selector circuit 36 is provided for selecting the station controlled the inclination of the scanning line in accordance with a station selecting signal from a CPU (not shown), and for outputting the control values ADM, ADY or ADBK to selected station.

The station selecting signal also enables the first counter 34 to begin its operation.

A VSYNC counter 37C is provided for counting the amounts representing a standard of the top margin. The counter 37C begins counting the synchronizing signal CDHSYNC in synchronizm with a print instruction signal C which is generated when the registration cyan marks 11, 12 are printed at the cyan station, and the counter 37C stops counting the signal START1 which is generated from the exclusive OR gate 35a when the marks detector 6 detects the cyan mark 12.

The count value of the VSYNC counter 37C represents a standard value of the top margin TO of the cyan station.

Then other top margin data TM, TY and TBK for the magenta, yellow and black stations are sequentially obtained with above described counting method. These top margin data are sequentially compared with the standard top margin data TO.

These top margin data TO, TM, TY and TBK are input to a third ROM38 as address data.

The third ROM38 initially stores control values for correcting top margin according to all of the top margin data TO, TM, TY and TBK. Thus the third ROM outputs the correction data DELAYM, DELAYY and DELAYBK of top margin for magenta, yellow and black station in response to the input top margin data.

A second counter 39 is provided for detecting the divergence of the mark 12 in a main scanning direction, which is perpendicular to the transporting direction of the belt 4.

This counter 39 starts counting a clock X1CLOCK in response to the generation of the main scanning synchronizing signal CDHSYNC, and stops counting the clock X1CLOCK in response to the mark detection signal CCD1P representing detection of the cyan mark 12. The count value $t_{01}$ of the second counter 39 is temporarily held in the memory (not shown), and this value represents a standard value of the horizontal divergence of the cyan mark 12.

Then horizontal divergence of other color data $t_{1M}$, $t_{1Y}$ and $t_{1BK}$ for the magenta, yellow and black stations are sequentially obtained. These other horizontal divergence data are sequentially output to a comparator 40. The comparator 40 sequentially compares the data $t_{1M}$, $t_{1Y}$ and $t_{1BK}$ with the standard data $t_{01}$, differential data ($\Delta t_{1M}=t_{01}$, $\Delta T_{1Y}=t_{1Y}-t_{01}$, and $\Delta T_{1BK}=t_{1BK}=t_{01}$) are then sequentially input to a second ROM41 as first address data.

A third counter 42 is provided for detecting the divergence of the mark 11 in the main scanning direction. This counter 42 starts counting the clock X1CLOC in response to the generation of the main scanning synchronizing signal CDHSYNC, and stops counting the clock X1CLOCK in response to the mark detection signal CCD2P representing that the mark detector.5 detects the cyan mark 11.

The count value $t_{02}$ of the third counter is temporarily held in the memory (not shown), and this value represents a standard value of the horizontal divergence of the cyan mark 11.

Then horizontal divergence of the other color data $t_{2M}$, $t_{2Y}$ and $t_{2BK}$ of the mark 11 for the magenta, yellow, and black stations are sequentially obtained, and input to a comparator 43.

The comparator 43 sequentially compares the data $t_{2M}$, $t_{2Y}$ and $t_{2BK}$ with the standard data $t_{02}$, and differential data ($\Delta t_{2M}=t_{2M}-t_{02}$, $\Delta t_{2Y}=t_{2Y}=t_{02}$ and $t_{02}$ and $\Delta t_{2BK}=t_{2BK}=t_{02}$ are sequentially input to the second ROM 41 as second address data.

The second ROM41 stores control data for controlling magnification and left margin in accordance with all of both divergence data $\Delta t_1$ and $\Delta t_2$.

Therefore, the magnification (the length of the scanning line) and the left margin of the magenta, yellow and black stations are sequentially adjusted with outputs A2, A3, A4, DM1, DY1 and DBK1 of the second ROM41 which are produced in response to input signals $\Delta t_{1M}$ and $\Delta t_{2M}$, $\Delta t_{1Y}$, $\Delta t_{2Y}$, $\Delta t_{1BK}$, and $\Delta t_{2BK}$.

The outputs A2, A3 and A4 respectively control the actuator 25 to adjust the magnification or the lengths of scanning lines of the magenta, yellow and black stations, and the outputs DM1, DY1 and DBK1 control the timing of the horizontal synchronizing signal representing printing start position in the horizontal direction to adjust the left margin.

By the way, the mark detectors 5 and 6 are respectively arranged to start reading from the standard positions S2 and S1.

Figure 5:
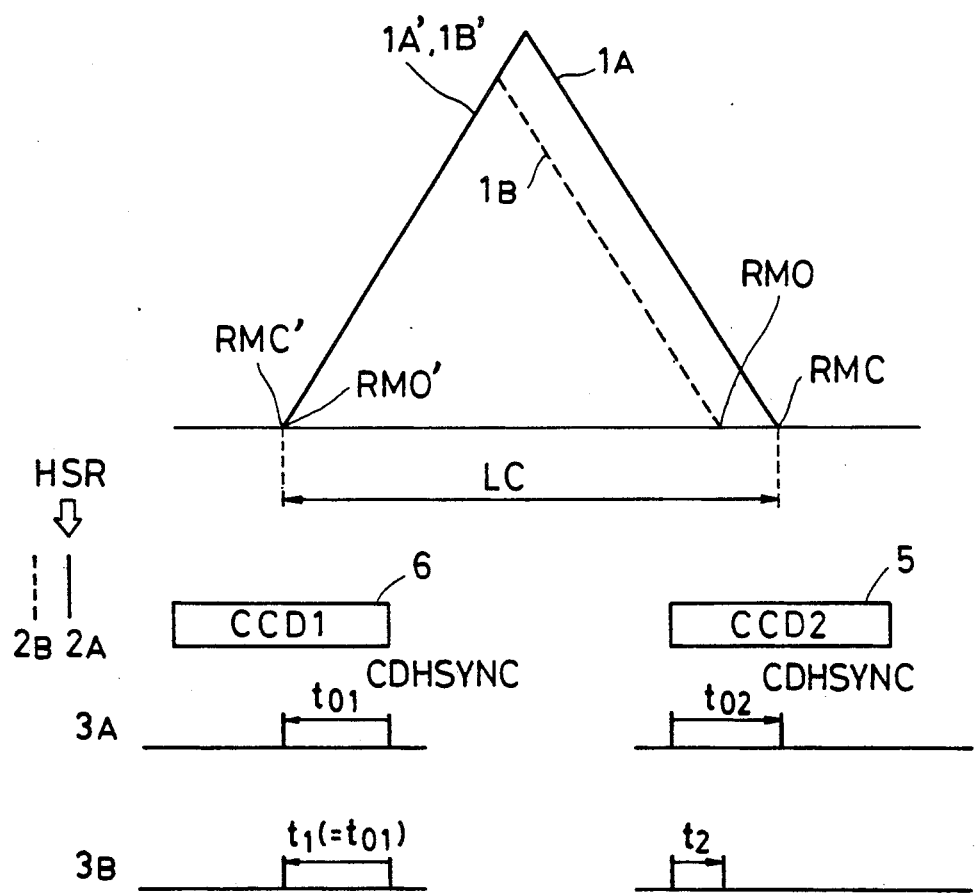
FIG. 5 is a timing chart explaining a reading operation by mark detectors.

FIG. 5 is a drawing for explaining reading operation of the mark detectors 5 and 6. In FIG. 5, a pair of scanning beams 1A and 1A' write cyan registration marks RMC and RMC' which become the standards registration marks. The length LC of the cyan scanning line between the two registration marks RMC and RMC' is therefore a standard length. On the other hand, a pair of scanning beams 1B and 1B' may write irregular registration marks RMO and RMO', which are written by one of other stations, such as the magenta, yellow or black station. Both reading output signals 3A are provided when the mark detectors 6 and 5 read the cyan registration marks RMC' and RMC which correspond to the part of scanning beams 1A' and 1A formed at the cyan station.

On the other hand, both reading output signals 3B are provided when the mark detectors 6 and 5 read the registration marks RMO' and RMO which are made by the pair of scanning beams 1B' and 1B formed by one of the other stations.

The mark detectors 5 and 6 detect the registration marks RMC and RMC' placed at both sides of the transporting belt, then the detecting outputs CCD2P and CCD1P are respectively obtained at the time $t_{01}$ and $t_{02}$ which correspond to the counted values of the clock X1CLOCK after the signal CDHSYNC is generated. These counted values $t_{01}$ and $t_{02}$ are stored into the memory.

On the other hand, in the case where both output signals 3B representing the registration marks RMO and RMO' of other stations are at the irregular positions, for example, the mark detector 6 detects and generates the detection signal CCD2P at the time $t_1$ ($=t_{01}$) after the signal CDHSYNC, and the other detector 5 detects and generates the detection signal CCD1P at the time $t_2$ ($\neq t_{02}$) after the signal CDHSYNC.

Therefore, the length of the scanning line of other stations does not coincide with that of the cyan station. If the time $t_2$ is shorter than the time $t_{02}$, the length of scanning line is shorter than that of cyan station. This result is used for adjusting the errors of the magnification, is input to the second ROM 41 which controls the actuator 25 varying the magnification, as an address signal.

FIG. 6(a) is a timing chart for explaining operations of the circuit of FIG. 4.

The control and detection operation for the errors of magnification and for the misregistration of left margin are explained as follows.

The mark detectors 5 and 6 read the cyan registration marks RMC (11) and RMC' (12), and the binarization circuits 32b and 32a output the output signals CCD2P and CCD1P in one scanning period 3.

As described above, the output signals CCD2P and CCD1P for the cyan marks RMC and RMC' are obtained at the time $t_{02}$ and $t_{01}$ which correspond to counted values of the counters 42 and 39 which count the clock X1CLOCK in synchronism with the signal CDHSYNC. These counted values $t_{02}$ and $t_{01}$ are temporarily stored in the memory.

Then the mark detectors 5 and 6 detect sequentially other registration marks RMO and RMO' of the magenta, yellow and black stations. In this case the detection output CCD1P is obtained at the time $t_1$ ($=t_{01}$) in the scanning period 2, and the detection output CCD2P is obtained at the time $t_2$ ($<t_{02}$) in the scanning period 3. The counted values $t_1$ and $t_2$ counted by the second and third counters 39 and 42 ar respectively output to the comparators 40 and 43. The comparator 40 compares the counted value $t_1$ and the standard (cyan) count value $t_{01}$, and the other comparator 43 compares the count value $t_2$ and the value $t_{02}$. The results $\Delta t_1$ (contents 0) and $\Delta t_2$ (contents-1) of both comparators 40 and 43 are input to the second ROM 41 as address signals.

In response to these address signals which are the results of comparison by comparators 40 and 43, and to the station select signal, the second ROM 41 sequentially outputs the magnification control signals A2, A3 and A4 for controlling magnification and the delay control signals DM1, DY1 and DBK1 for controlling the left margin.

The second ROM 41 initially stores all data of the magnification control signals and the delay control signals according to the results of the comparison.

Thus, the magnifications and the left margins of the magenta, yellow and black images are caused to coincide with that of the cyan image which is the standard for adjustment.

The explanation of the adjustment of the inclination of the scanning line is as follows.

As described above, the first counter 34 starts counting when the signal CCD1P for the cyan mark 12 is produced by the mark detector 6 during the horizontal scanning period 2 in synchronism with the signal START1 which is generated by the exclusive OR gate 35a. Then the first counter 34 stops counting the signal CDHSYNC when the signal CCD2P for the cyan mark 11 is produced by the detector 5 in the period 3, and holds the counted value of the signal CDHCYNC. The standard count value $N_o$, which represents the standard amount of the inclination of the cyan scanning line is thus obtained.

Then other scanning inclination data of the other stations Nm, Ny and NBK are sequentially obtained in the same manner as is that for the cyan station. The first counter 34 sequentially compares the inclination data for the other stations NM, NY and NBK with the standard inclination data No, and differential values thereof are sequentially obtained. These differential values are respectively and sequentially input to the first ROM 35 as an address signal.

The first ROM 35 stores the control values ADM, ADY and ADBK for the actuators 26 and 27 in accordance with all of differential data from the first counter 34, and the station select signal which is input to the selector 36.

The output control values ADM, ADY and ADBK from the first ROM 35 controls the actuators 26 and 27 of each station, and the angle of the reflecting body 24 of each station can thus be adjusted.

Accordingly, the inclination of the scanning lines of the magenta, yellow and black stations are made to coincide with the inclination of the scanning line of the cyan station.

The explanation of adjustment of the top margin is as follows.

The VSYNC counter 37C starts counting the signal CDHSYNC at the time when the print instruction signal to write the registration marks at the standard cyan station is generated, namely when the cyan station begins writing the marks 11 and 12 in response to inputting of the instruction signal into the terminal START of the counter 37C. When the mark detector 6 detects the top of the cyan mark 12, the counter 37C stops counting the signal CDHSYNC in response to the detection signal CCD1P from the binarization circuit 32b representing the detection of the mark 12. The counted value T0 by the counter 37C is a standard value for the adjustment of the top margin. Similarly, until the mark detector 6 detects registration marks representing the other color after the instruction signals representing writing of the marks, VSYNC counters 37M, 37Y and 37BK respectively count the synchronizing signal CDHSYNC. The counted values TM, TY and TBK by the counters 37M, 37Y and 37BK are input to the third ROM 38 as address data therefor. The third ROM 38 initially stores control values for correcting the top margin according to all of the counted values. Thus, the third ROM 38 outputs the correction data DELAYM, DELAYY, and DELAYBK of the top margin for the magenta, yellow and black stations in response to the counted values.

These correction data DELAYM, DELAYY and DELAYBK are used for adjusting the timing of outputting the vertical synchronizing signals, which decide the timing of start of writing images at the magenta, yellow and black stations.

As described above, the top margin of the magenta, yellow and black stations are made to coincide with that of the cyan station.

By the way, if the VSYNC counters 37C, 37M, 37Y and 37BK simultaneously start counting in synchronism with the same timing print instruction signals, the differences of the count values of magenta, yellow and black counters and the cyan counter may be used directly as the correction data, DELAYM, DELAYY, and DELAYBK.

In this embodiment, each of the counters 37C, 37M, 37Y and 37BK stops counting in response to the respective detection outputs CCD1P representing the cyan, magenta, yellow and black marks 12. Therefore, for example, the circuit should be structured such that the counter 37BK does not stop counting in response to other detection outputs CCD1P representing cyan, magenta and yellow. After all registration marks 11 and 12 are detected by the detectors 5 and 6, the marks 11 and 12 on the transportation belt 4 are cleaned or removed by the cleaning member 8 in preparation for the next recording of the registration marks or real images.

By the way, the controller 13 can have a function of limiting the correction processes as described below. For example, when by an external controller (not shown) or color mode designation key on the color printing apparatus, a full color mode is designated as a color mode, as described above all stations form registration marks and the controller 13 adjusts the magenta, yellow and black stations in accordance with the cyan marks. However, when only two colors among four colors are designated as imaging colors, two stations corresponding to those two imaging colors are adjusted as described above, and the other stations the colors of which are not used are not adjusted. And when only one color is designated as the imaging color, the adjustment process is not carried out at all. For example, when a two color copy mode using cyan and magenta is selected, cyan and magenta marks are formed by corresponding stations respectively In accordance with the difference between the detection timing of the cyan marks and the detection timing of subsequent magenta marks, namely depending on the registration condition of the cyan station, the optical length between the optical scanner 3M and the photosensitive drum 1M, the length of the scanning line and the angle of the scanning line to the axis of the drum 1M in the magenta station are adjusted by driving actuators on the magenta station such that the registration condition of magenta station coincides with that of the cyan station. In this case, yellow and black stations which are not used do not form registration marks. Therefore the detectors 5 and 6 do not detect the yellow and black marks, and the controller 13 does not drive the actuators in these stations. Namely the yellow and black station are not adjusted at all.

Thus if colors used for image reproduction are cyan an magenta, the adjustments are made for the cyan and magenta stations. Only the operation in the two color mode using cyan and magenta is explained above. But in the three color mode, one color mode, or different combinations of colors, the station adjustment can be selected similarly. The standard station may be selected at will in such case.

In case a one color mode is designated, all the adjustments are prohibited, or only the designated station corresponding to the one color is adjusted.

For example, the adjustments may be carried out as shown in FIG. 6(b). In a step S1, it is discriminated whether or not the full color mode is designated. If the full color mode is designated, all stations form registration marks in a step S2. Then magenta, yellow and black stations are adjusted so as to make the misregistration conditions coincide with those of the cyan station in step S3 as described above. After the adjustments image forming operation is carried out in a step S4.

On the other hand, if a three color mode is designated (step S5), it is discriminated whether or not cyan is included among the three colors in a step S6. If the three color mode does not include cyan, steps S2 through S4 are carried out the same as the full color mode such that the magenta, yellow and black stations should be adjusted to coincide with the standard cyan station. If the three color mode includes cyan, the registration marks for cyan and the other two colors which comprise the three colors are formed in a step S7. Then two stations corresponding to the other two colors are adjusted to coincide with the cyan station in a step S8.

If the two color mode is designated in a step S9, it is discriminated whether or not cyan is included among the two colors in a step S10. If the two color mode includes cyan, the cyan registration mark and that for the other one color which form the two colors are made by the corresponding stations in step S11. Then the station corresponding to the other one color is adjusted with respect to the standard cyan station in a step S12.
· If the two color mode does not include cyan, the cyan station and two stations corresponding to the two colors form the registration marks in a step S13, and the two stations are adjusted to the cyan station in a step S14.

Finally, the one color mode will be explained as follows.

Initially, it is discriminated whether the one color mode is the cyan mode in step S15. If the one color mode is the cyan mode, image forming operation is carried out without adjustment because the cyan image is formed by the standard station. If the one color mode does not use cyan the color, the cyan station and the one station corresponding to the one color each form registration marks in a step S16. Then the registration of the one station is adjusted to that of the cyan station in step S17, and, after the adjustment, image forming operation is carried out.

Thus, in accordance with input color mode information, adjustments for stations not being used many particular mode are limited or prohibited by correcting means. Therefore, adjustments are carried out just for the stations being used so that the adjustment process for correcting misregistrations can be shortened and the colors used to form an image can be superimposed accurately.

During the image forming operation for the colors being used it is not needed to make an adjustment for the other stations which are not used in image forming. Therefore, in the other stations corresponding to the using colors not used, the useful life of various element which are fixed on the driving members, e.g., drum motors, sleeve motors and the like can be increased.

In this embodiment, as shown in FIG. 1(a), the standard station, that is the cyan station is fixed, and in accordance with the cyan marks formed by this cyan station, the lengths of the optical path, the lengths of the scanning line and the inclinations of the scanning line formed by other stations are corrected or adjusted with actuators 25 through 27 using synchronizing signals. However, as shown in FIG. 1(b), manual adjusting screws 45 through 47 may be arranged at positions in the cyan station corresponding to the actuators 25 through 27 to maintain the apparatus in an appropriate attitude and to reduce the amounts of automatic adjustment.

In FIG. 1(c), actuators 25 through 27 may be arranged at the cyan station in order to maintain the apparatus in an appropriate attitude, to reduce the amounts of adjustment and to intentionally and automatically adjust the standard station for reducing the amounts of adjustment of the other dependent stations.

Referring to FIG. 7 through FIG. 10, an other embodiment will be explained as follows.

Figure 7A:
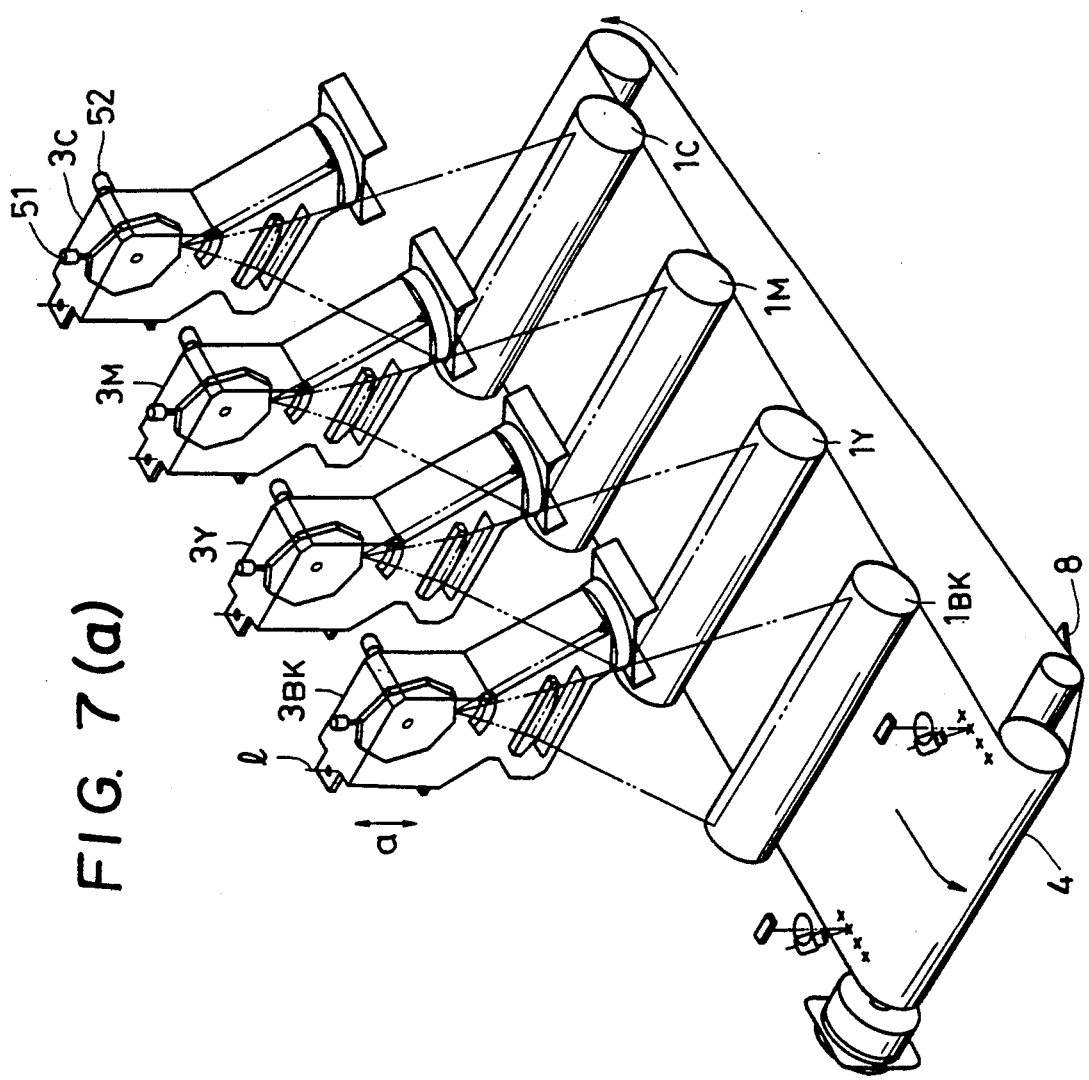
FIG. 7(a) and 7(b) are respectively a perspective view and a partially enlarged perspective view of image forming apparatus in accordance with a modified embodiment of the present invention.
Figure 7B:
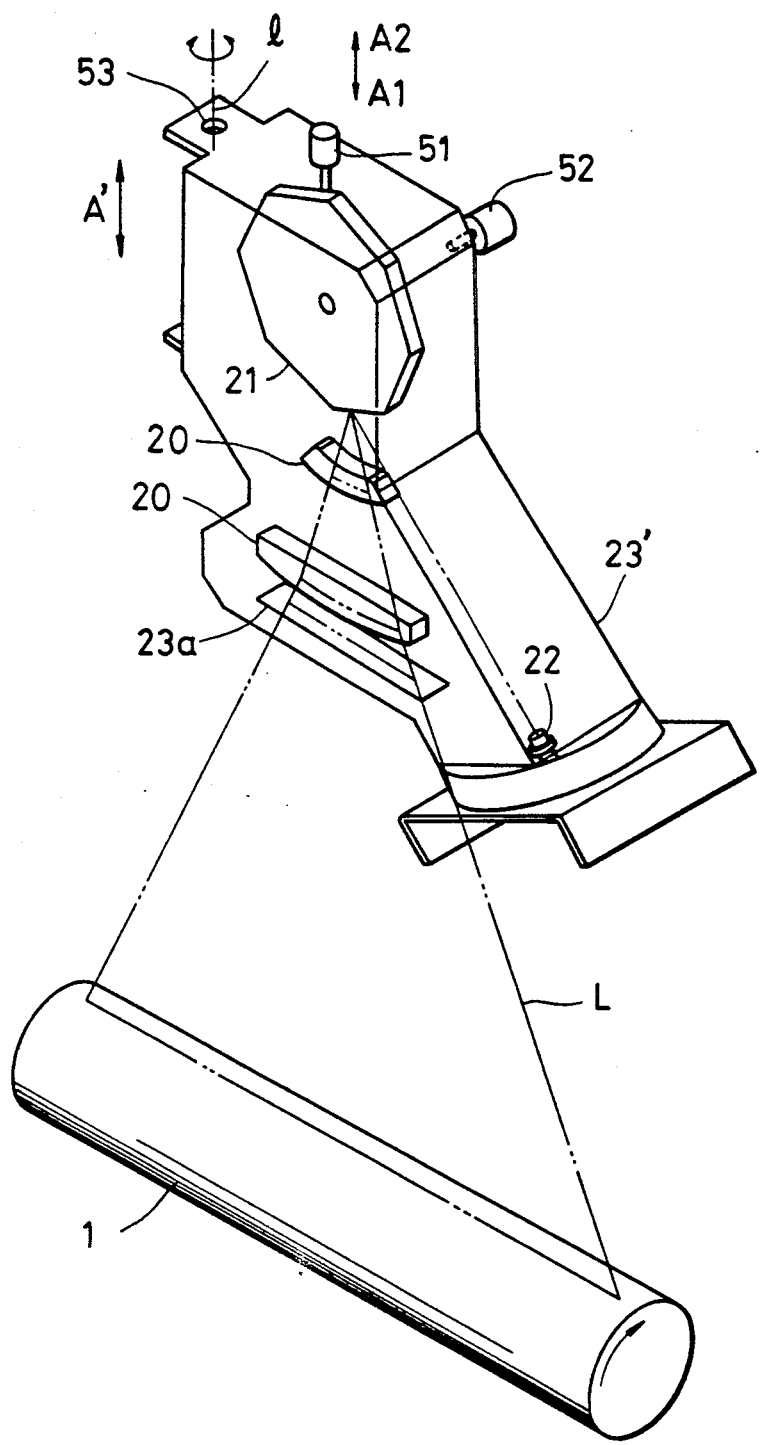

FIG. 7(a) and 7(b), respectively show a perspective view and a partial perspective view of this other embodiment of the present invention. In FIGS. 7(a) and 7(b), the same elements as these shown in FIG. 1(a) and FIG. 2 have the same identifying numbers.

In FIG. 7(a) and 7(b), the apparatus includes actuators 51 and 52. The actuator 51 vertically moves the optical box 23 along a guide (not shown) which is received in a hole 53 with a certain amount of play. The actuator 51 moves the optical box 23 in the direction Al, and the length of the optical path between the laser generator 22 and the photosensitive drum 1 is thus altered. On the other hand, the actuator 52 rotates the optical box 23' on the guide which is received in the hole 53, and the inclination of the scanning line can thus be corrected. As described above, instead of moving the reflecting body 24 in FIGS. 1(a) and 1(b), moving the optical box 23' corrects the length of the optical path and the inclination of the scanning line. Therefore, the type of apparatus shown in FIG. 7 can be readily applied to the present invention.

Figure 8A:
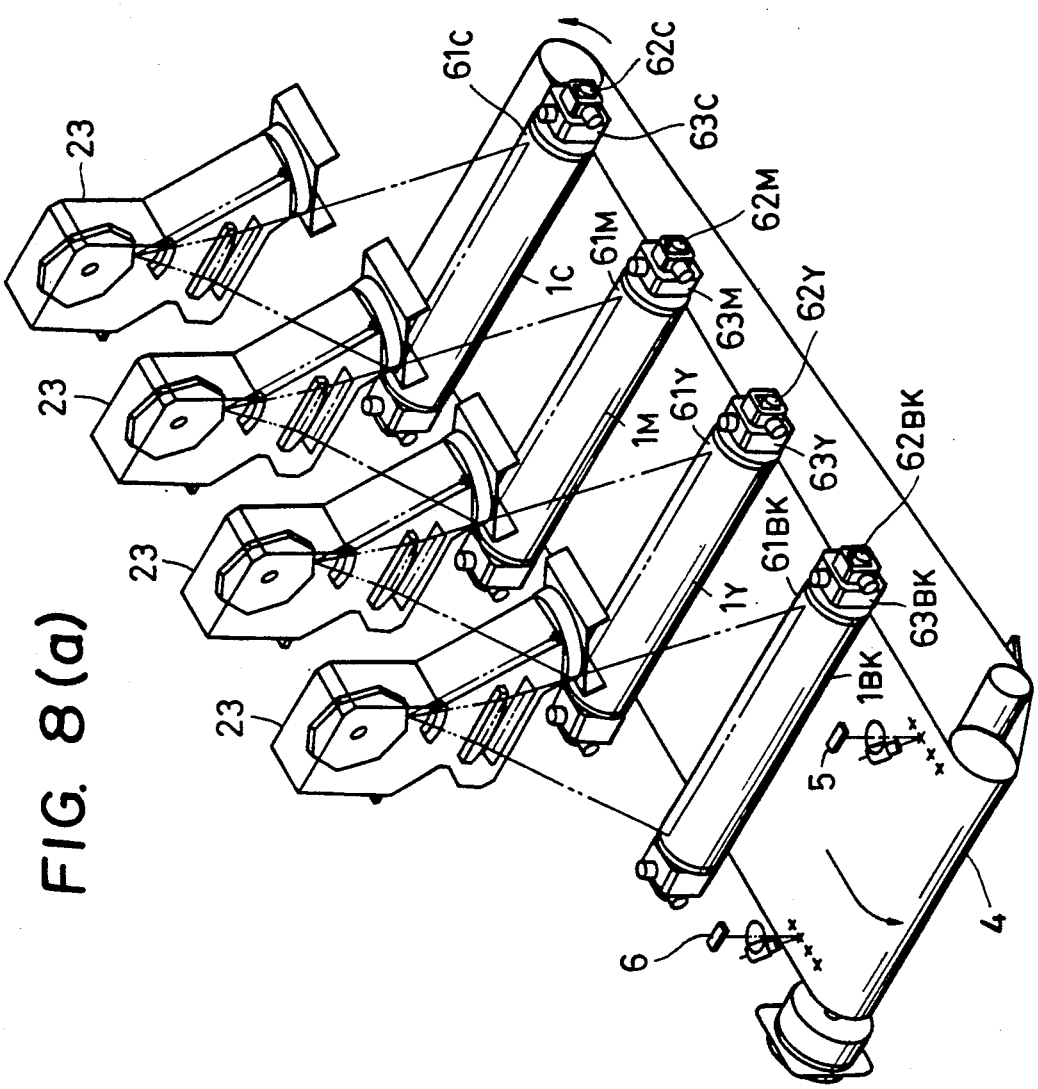
FIGS. 8(a) through 8(c) are respectively a perspective view, a partial enlarged perspective view, and a partial cross-sectional view of another modified embodiment of the present invention.
Figure 8B:
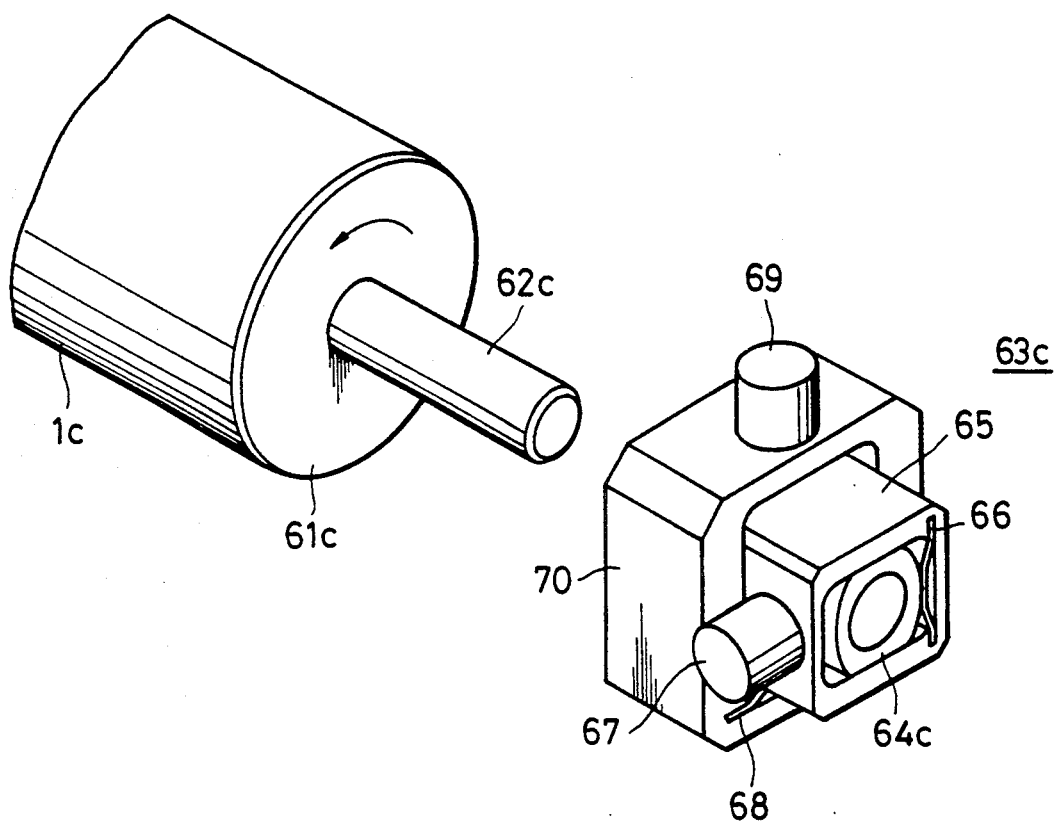
Figure 8C:
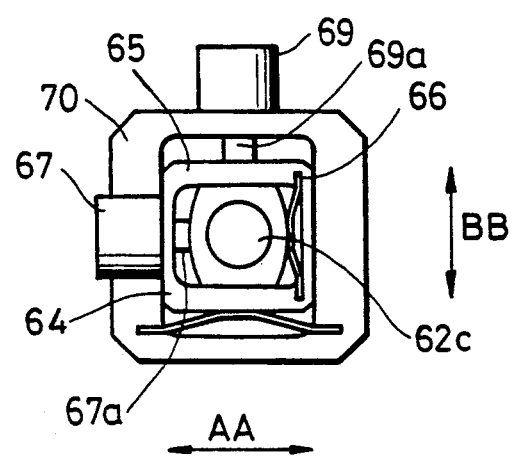

FIGS. 8(a) through (c) respectively show a perspective view and a partial perspective view and a partial cross sectional view of another embodiment of the present invention.

In FIGS. 8(a) through (c) the same elements as those shown in FIG. 1(a) and FIG. 2 have the same identifying numbers.

In FIGS. 8(a) through (c), flanges 61C, 61M, 61Y and 61BK are respectively fixed at the both ends of the photosensitive drums 1C, 1M, 1Y and 1BK. The flanges 61C, 61M, 61Y and 61BK respectively have shafts 62C, 62M, 62Y and 62BK, and bearing apparatus 63C, 63M, 63Y and 63BK which respective have bearings 64C, 64M, 64Y and 64BK supporting the shafts 62C, 62M, 62Y and 62BK for rotation.

Each of bearings 64 is supported by an internal case 65 such that the bearing 64 can move in a direction AA along a guiding rail or gutter (not shown) (FIG. 8(c)). The bearing 64 is urged by a spring 66 to touch a projection 67a of an actuator 67 which comprises a stepping motor or the like. Thus the actuator 67 can move the bearing 64 in the direction AA.

On the other hand, the internal case 65 is designed so that it can move in a direction BB in a outermost case 70 which accommodates the internal case 65. The internal case 65 is urged by a spring 68 touch a projection 69a of an actuator 69 which also comprises a stepping motor or the like.

Thus, actuator 69 can move the internal case 65 in the direction BB which is perpendicular to the direction AA. The internal case is supported by a rail or a gutter (not shown). As shown in FIG. 8(a), bearing apparatus 63C, 63M, 63Y and 63BK are respectively fixed to both ends of the photosensitive drums 1C, 1M, 1Y and 1BK such that horizontal directions of all of the bearing apparatus made to are coincide in the direction AA and that vertical directions of them are made to coincide in the direction BB. Therefore, when the actuators 69 at both ends are driven in the same direction BB, the photosensitive drum is moved in the direction BB or in the direction which is perpendicular to the line made on the drum by the scanning beam. Then the optical path between the laser generator and the drum can be verified to correct the magnification of the image.

On the contrary, when one of the actuator 67 at the both ends is driven in the direction AA or both of the actuators 67 are driven in opposition to each other, the axis of the drum is inclined. Therefore the inclination of the drum can be corrected.

And when both of the actuators 67 at both ends of a drum are driven in the same direction AA, the drum is moved in the direction AA perpendicular to the scanning line. Therefore, the top margin can be corrected.

As described above, instead of moving the scanning member, the reflecting body 24 in FIG. 1(a) or the optical box 23 in FIG. 7, by moving the drums in a predetermined directions, the misregistrations can be corrected.

Figure 9:
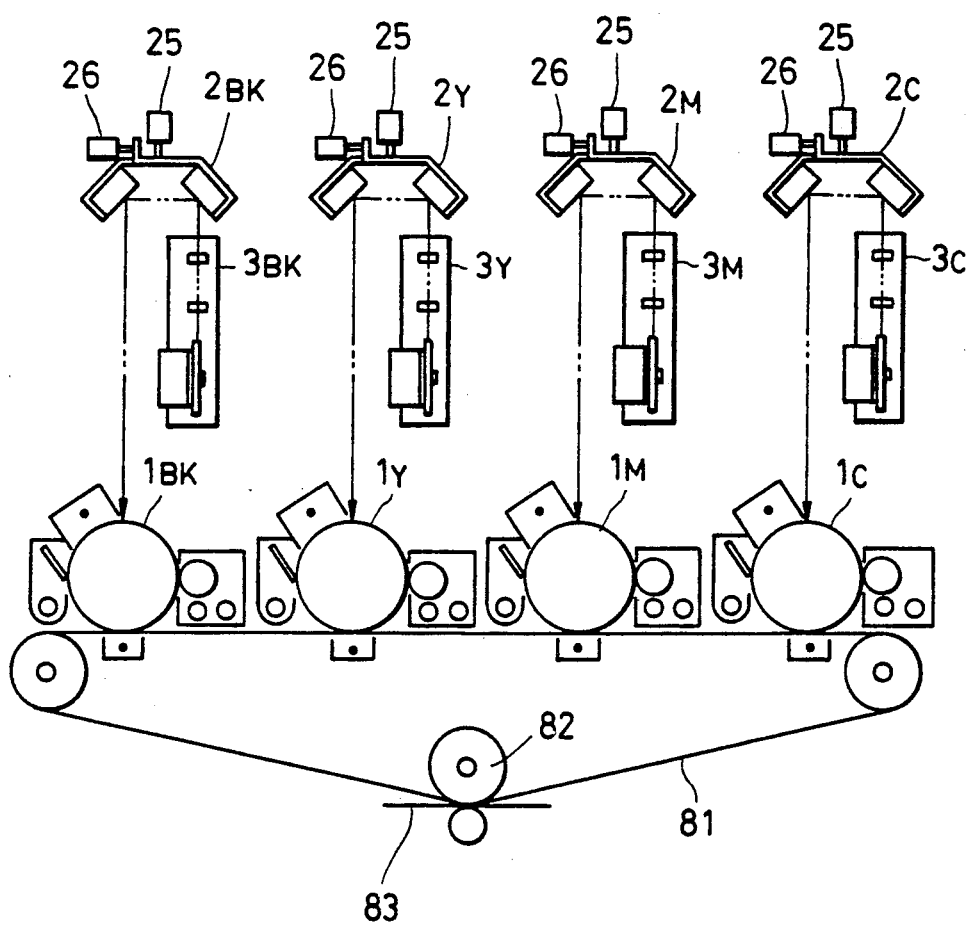
FIG. 9 and FIG. 10 are cross-sectional views showing other modified embodiments of four drum full color image forming apparatus.

Further, the present invention can easily be applied to an image forming apparatus in FIG. 9 which includes a intermediate transferring belt 81 on which the color images are formed and a transferring roller 82 which transfers the image on the belt 81 to paper 83.

Figure 10:
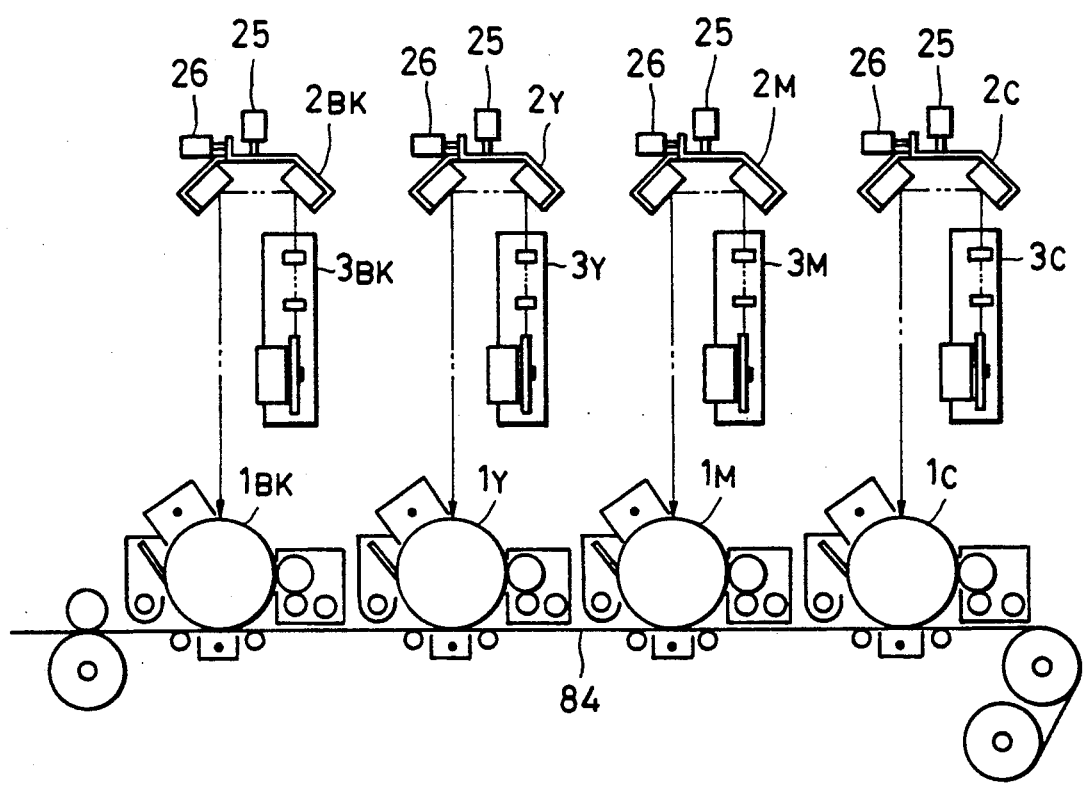
Figure 11:
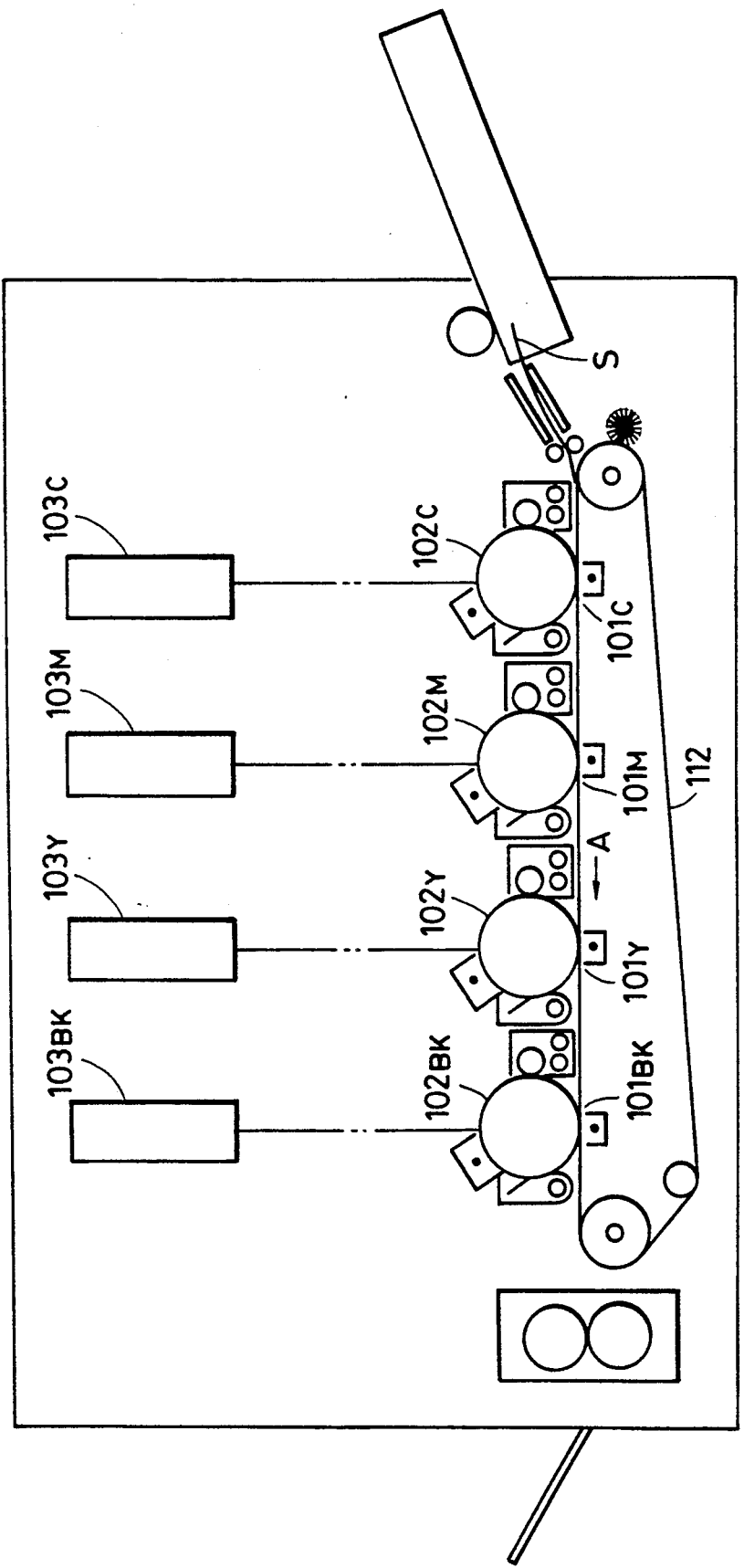
FIG. 11 is a cross-sectional view showing a conventional four drum full color image forming apparatus.
Figure 12A:
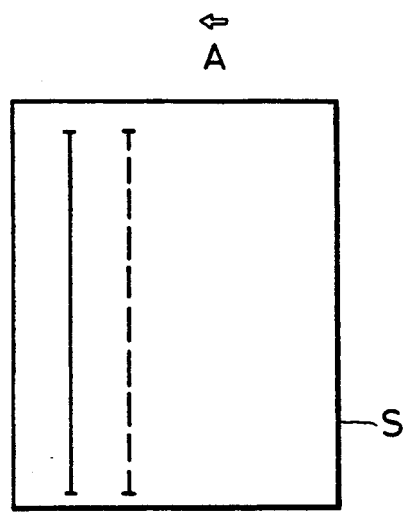
FIGS. 12(a) through 12(d) are views for explaining kinds of misregistrations.
Figure 12B:
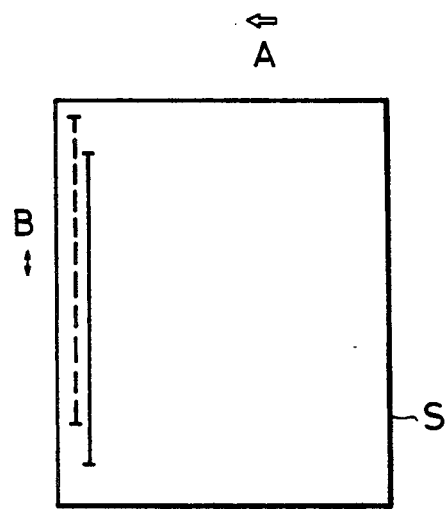
Figure 12C:
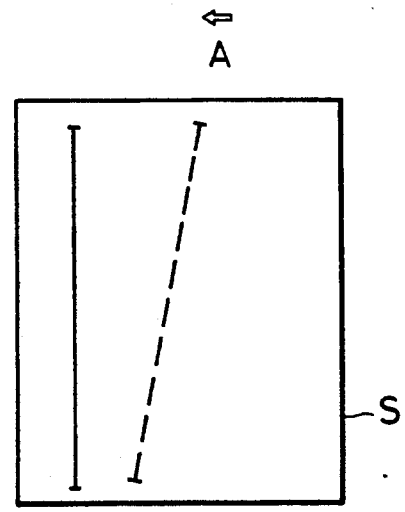
Figure 12D:
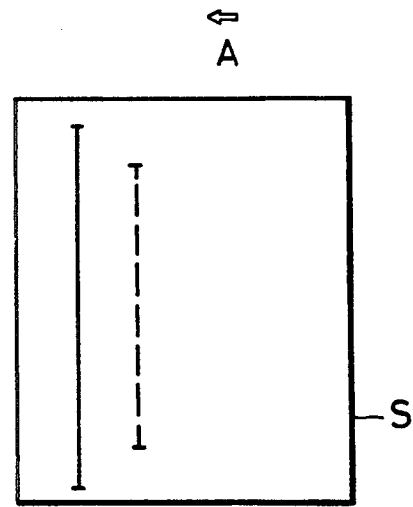
Figure 13A:
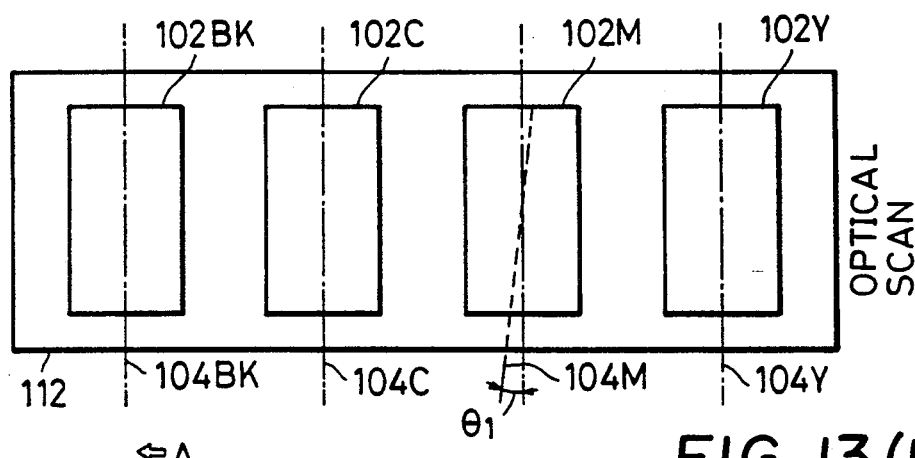
FIGS. 13(a) through 13(c) are views explaining a misregistration of images caused by a misposition of an optical scanner.
Figure 13B:
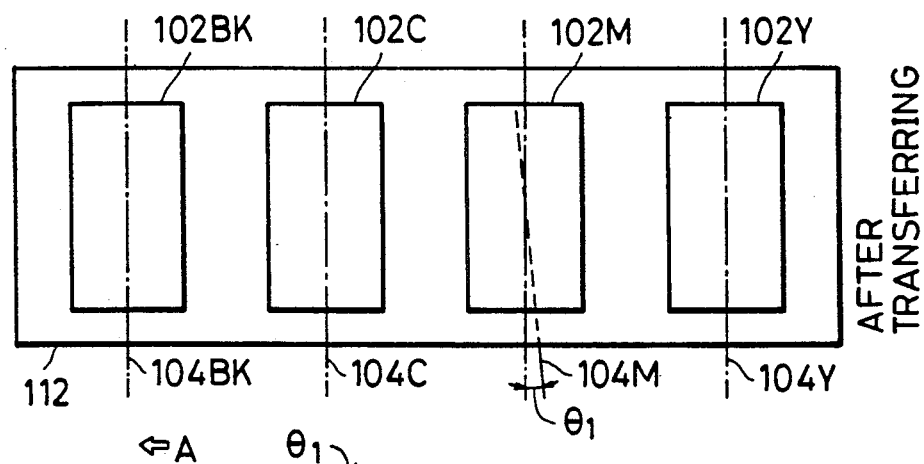
Figure 13C:
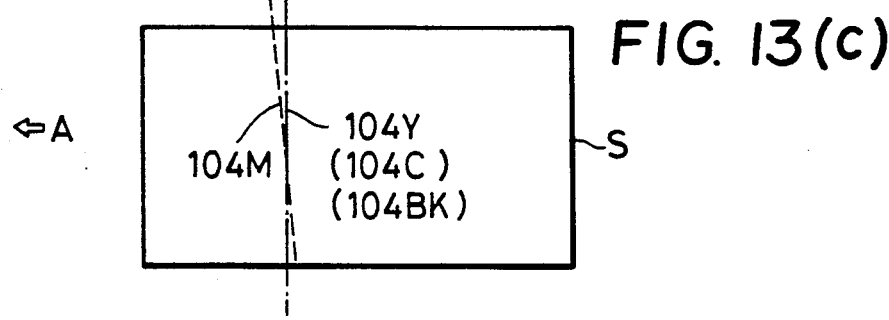

And the present invention also can be applied to a color printer as shown in FIG. 10 which uses a long roll paper 84 as a transferring medium. In those embodiments, the misregistrations can be corrected as explained above. By the way, in the above embodiments, four drum type color printers are used. However, the present invention can be applied to two or three color printers or to other types of printers which make a superimposed image.

In the first embodiment, two mirrors in the reflecting body 24 are shapedly inverted "V". However, the number of mirrors and the angle of both mirrors can be freely modified. For example, two mirrors can be fixed in an "L" shape.

Further, the shape and position of the registration marks can be freely modified such as to, "|—", "—", "|". The cleaner for cleaning the registration marks can also be freely modified to comprise for example, a fur brush or an air absorber for preventing generation of detection errors of the misregistrations. Further, the marks can be reversely transferred to the photosensitive drum by a transferring charger, then a cleaner for the drum to withdraw toner corresponding to the marks.

In this embodiment, the two detectors 5 and 6 detect the registration marks 11 and 12. However, the number of the detectors is not limited to two. Any number of the detectors can be used.

More detectors can be arranged in the same line or on the different lines to accurately detect the registration marks 11 and 12.

In this embodiment, the most upstream station is the cyan station, but even if another color station is set as the most upstream station, the same effect can be obtained as that described with reference to the cyan station.

As described above, in this embodiment among a plurality colors of registration marks which are transferred on the transporting body, registration marks which are formed by the most upstream image holding body are selected as the standard registration marks, and the detecting timing of the standard registration marks is compared to that of the other registration marks. In accordance with differences therebetween, the starting position of image formation, the angle of the scanning line and the magnification of the image of other image forming stations other than the most upstream station are corrected. Therefore, according to the standard registration marks which are formed with the most accurate timing, and are most stably formed on the transporting body, the misregistration of other stations can be detected and corrected accurately. Accordingly the images formed by all stations can be superimposed accurately, and high quality color images can efficiently be obtained.

In the first embodiment in FIG. 1 through FIG. 16, the registration marks formed by the most upstream station or the closest station to the registration rollers is used as a standard.

But in another embodiment, which is explained as follows, the registration marks formed by the most downstream station of the transportation belt 4 are used as a standard.

Figure 17A:
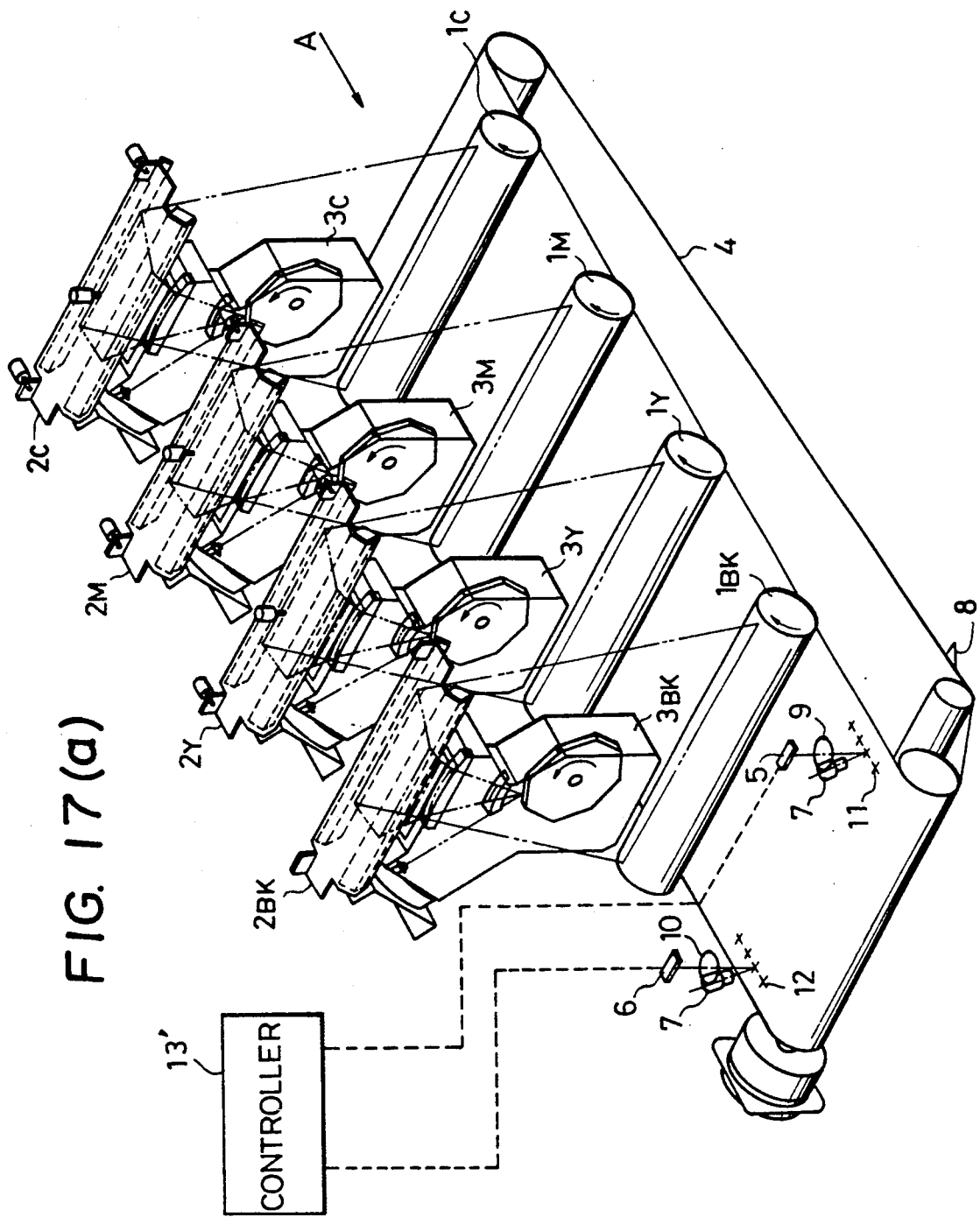
FIG. 17(a) is a perspective view showing a four drum color printer in accordance with an embodiment of the present invention.

As shown in FIG. 17(a), in the black image forming station which is the most downstream station relative to the transportation belt 4, the photosensitive drum 1BK, the optical mirror 2BK and the optical scanner 3BK are installed in fixed position at the time of assembly, there being no adjustment equipment explained with reference to FIG. 2 being provided. On the other hand, other image forming stations have adjusting equipment for enabling movement of the photosensitive drums 1C, 1M and 1Y, the optical mirrors 2C, 2M and 2Y, and the optical scanner 3C, 3M and 3Y.

Differences between this embodiment and those described previously are which stations is the standard, and whether stations should be adjusted. The standard station in this embodiment operates in the same way as that in prior embodiments, and the adjustable stations this embodiment function the same way as that in the prior embodiments. A controller 13' operates similarly to the operation of the controller 13 in FIG. 1(a). Namely the controller 13' detects differences between detection timing of black registration marks and the registration marks of other colors. The controller 13' adjusts the optical path, the magnification and the inclination of the scanning beams from each of the optical scanners 3C, 3M and 3Y so as to cause the position of the cyan, magenta and yellow scanning lines to coincide with that of the black scanning line in accordance with the differences detected by the controller 13'.

The reason why the most downstream station relative to the transportation belt is selected as the standard station for the adjustment is as follows.

In a four drum color printer like the present embodiment, a driving source for driving the transportation belt 4 is ordinarily installed at the most downstream position relative to the transporting direction of the belt 4. A belt 4 made of polyimide or polyurethane especially can change in its elasticity, spread, stepping aside and floating in a mixed manner. It is very difficult for all of the surface of the belt 4 to transport uniformly at a predetermined speed. However, the area of the belt near the driving source can almost always be transported at an ideal speed.

Therefore, in the most downstream station, in this case the black station, the belt 4 is transported most stably. The registration marks which are transferred at the black station is formed with most ideal size.

The registration marks which are formed at stations other than the black station may be broken by contacting or rubbing with the image formation part when the marks pass a subsequent station. But, there is no station downstream of the black station and the black marks therefore, are not broken, are not mixed with other colors, and are not separated. Further, in this embodiment, since the most downstream station is the black station, which can make high density marks, the mark detectors 5 and 6 can read the black marks in a stable condition without reading errors.

Therefore, in this embodiment, the black station at the most downstream position of the belt 4 is used as the standard station. The registration marks formed by the black station are used as standard marks for adjustments.

Figure 14:
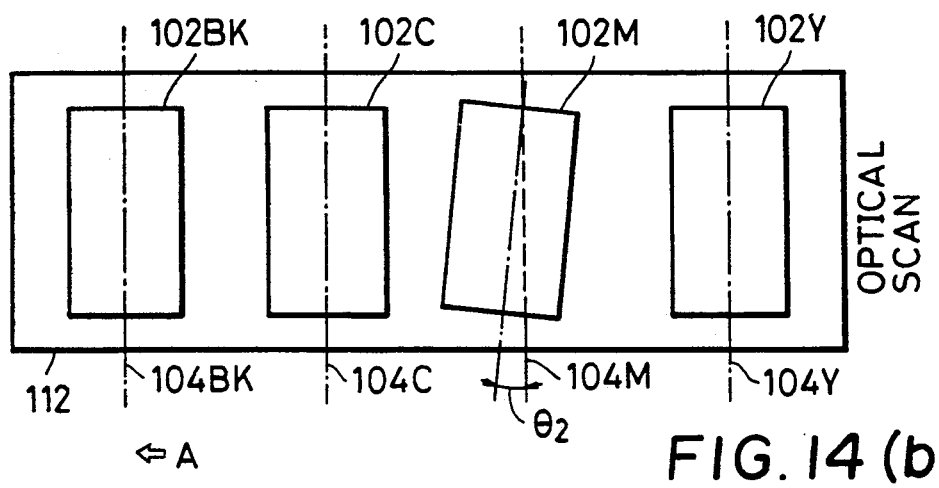
FIGS. 14(a) through 14(c) are views explaining a misregistration of images caused by a misposition of a photosensitive drum.
Figure 14:
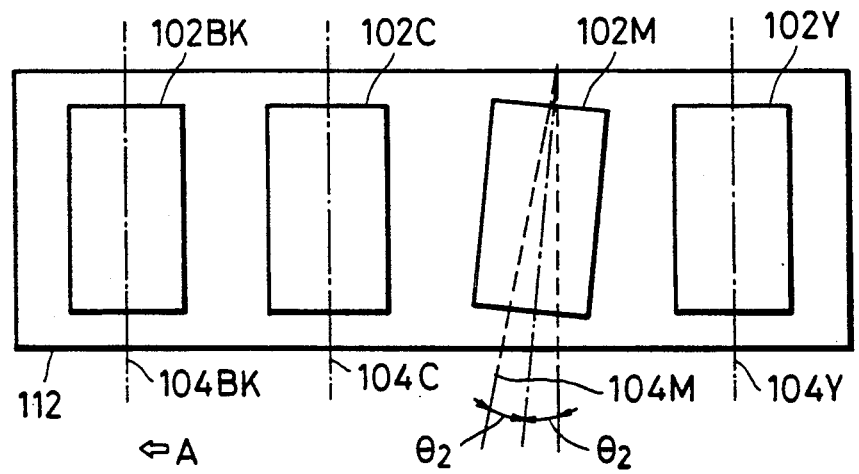
Figure 14:
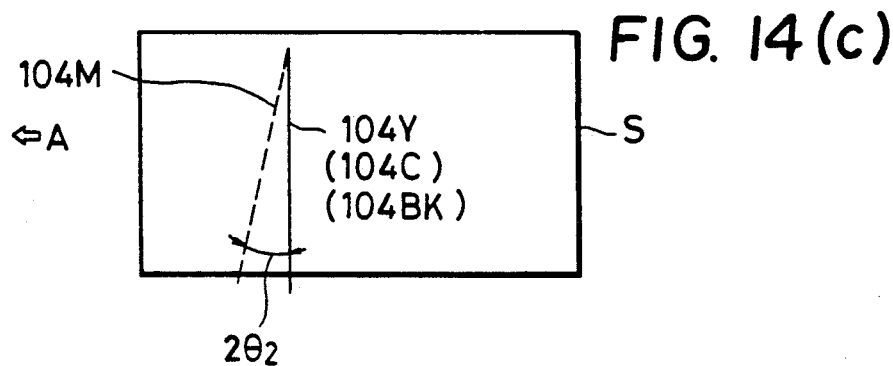
Figure 15:
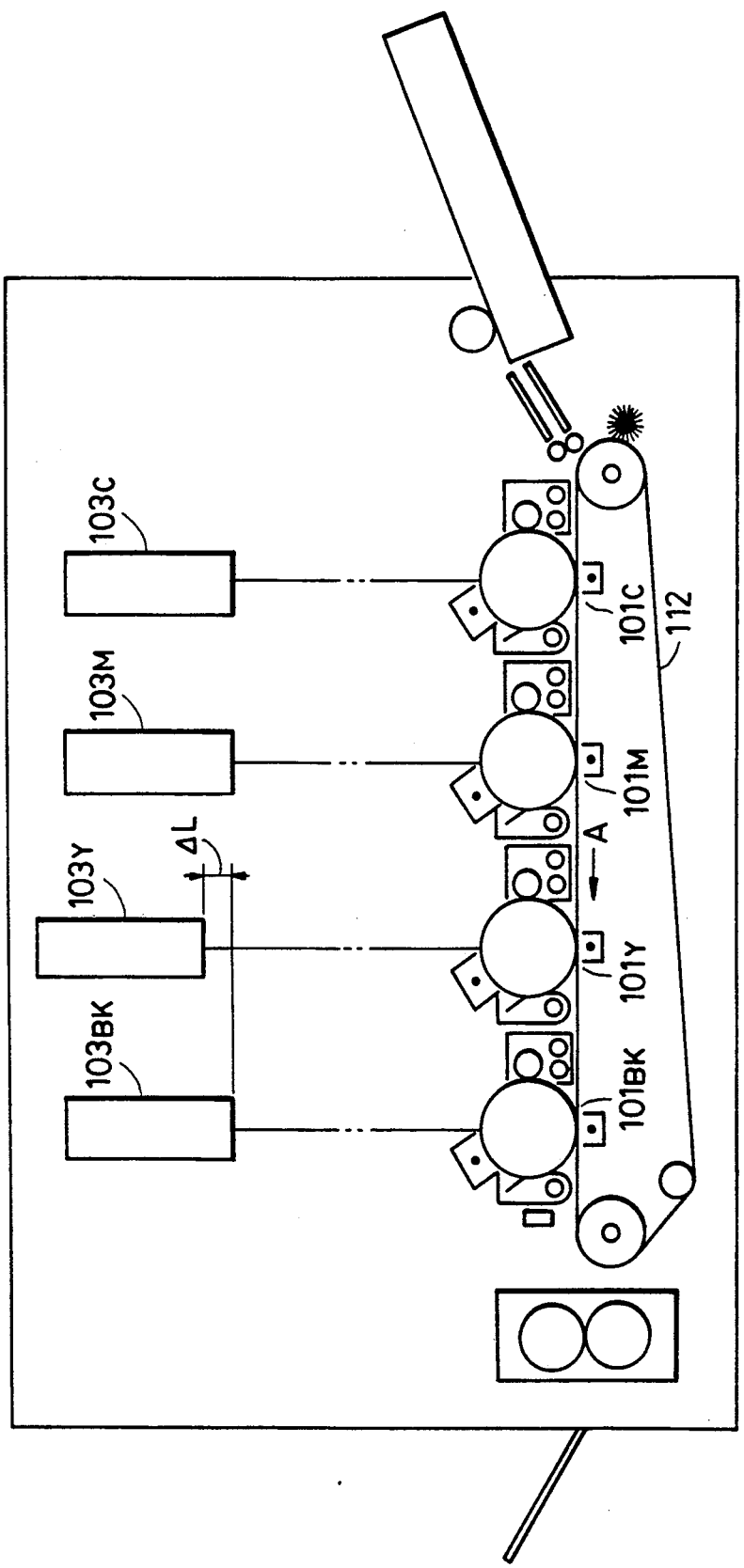
FIG. 15 is a cross-sectional view explaining a misregistration caused by an error in the optical path length of a light beam.
Figure 16:
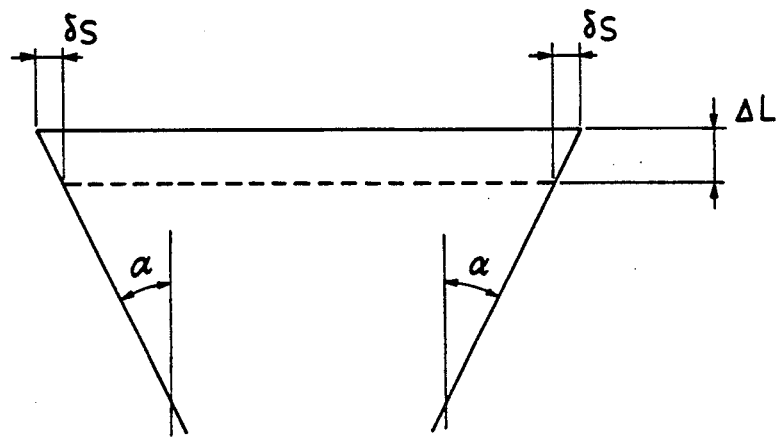
FIG. 16 is a schematic view explaining an error in the magnifications caused by an error of an optical path length of a light beam.
Figure 18A:
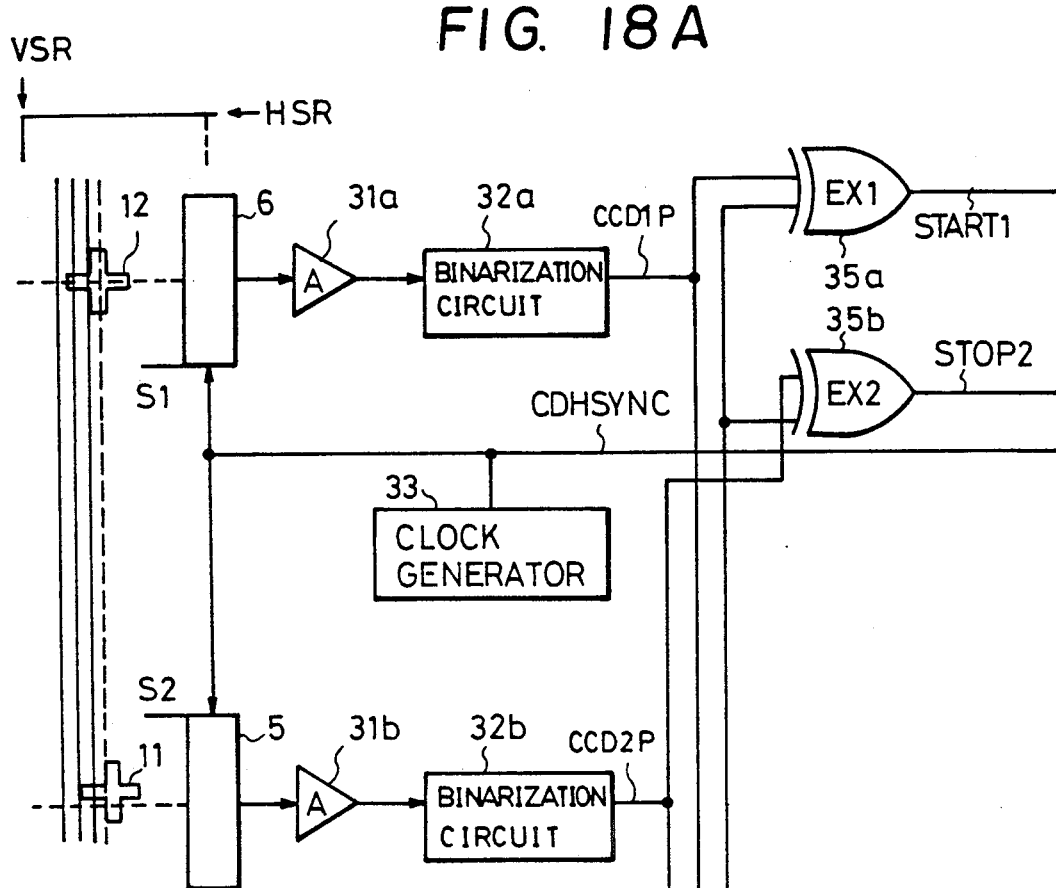
FIGS. 18A and 18B, is a block diagram of a controller in used in the embodiment of FIG. 17(a).
Figure 18:
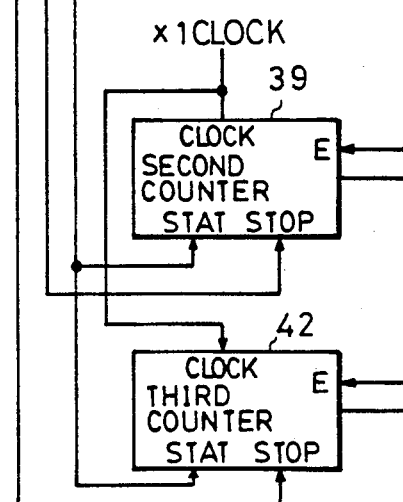
FIG. 18, comprising
Figure 18B:
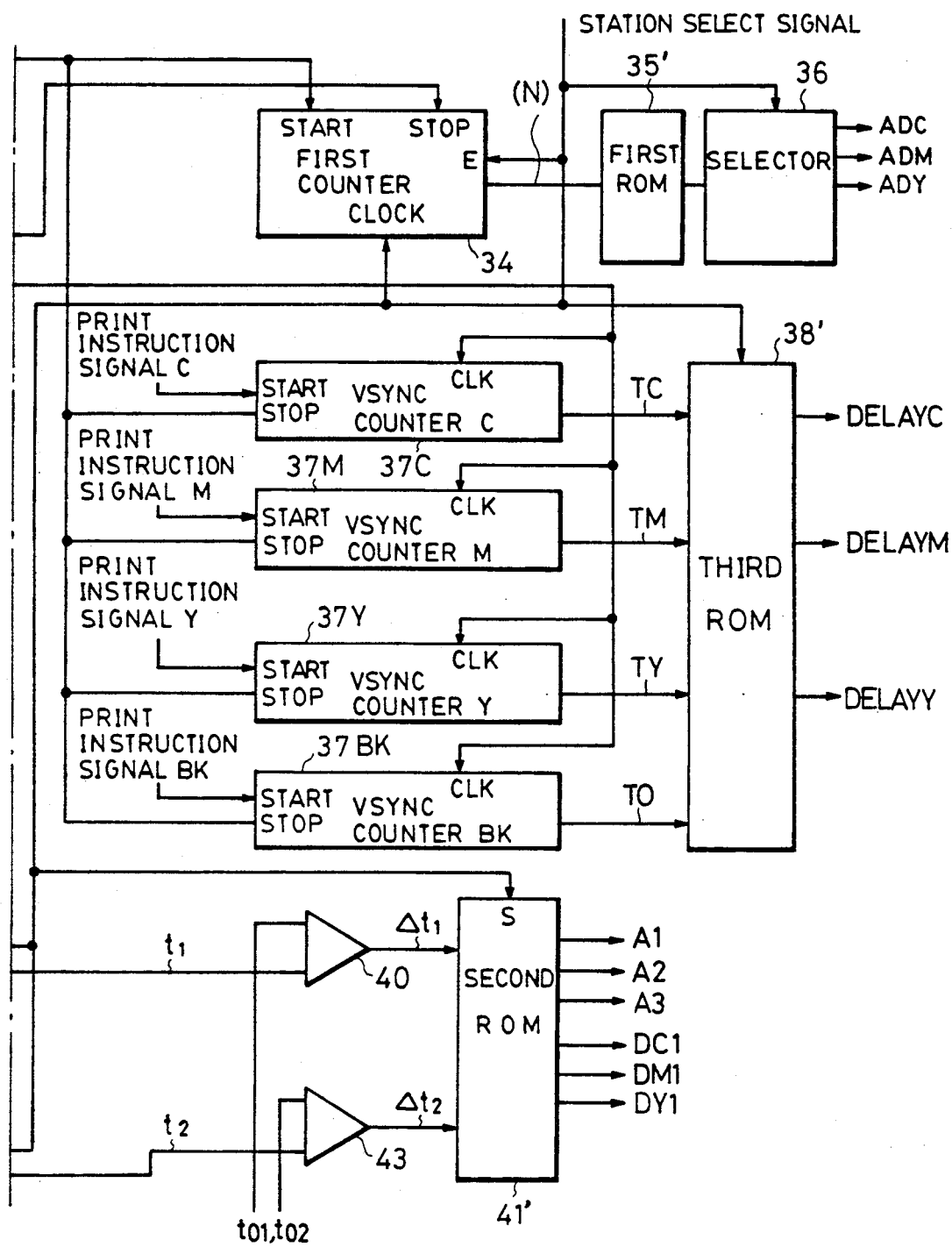

FIG. 18 shows a control block diagram of the controller 13' in FIG. 17(a), which is similar to FIG. 14. But, since the black marks are used as the standard, the first ROM35', the second ROM41' and the third ROM38' output control signals for cyan, magenta and yellow stations.

Namely, the controller 13' detects the standard data representing the top margin, the left margin, the inclination of the scanning line, and the magnification in accordance with the detection output of the black marks, and adjusts the cyan, magenta and yellow stations in response to the differences between the standard data and other detection data which are obtained when the controller 13' detects the marks or the other colors.

By the way, all variations or modifications shown in the first embodiment can be applied to the present embodiment.

For example, as shown in FIG. 17(b), manual adjusting screws 45 through 47 may be arranged at positions on the black station corresponding to the actuators 25 through 27 to maintain the apparatus in the correct position and to reduce the amounts of automatic adjustment.

As shown in FIG. 1(c), actuators 25 through 27 may be arranged at the black station in order to maintain the apparatus at the correct position, to reduce the amounts of adjustment and to intentionally and automatically adjust the standard station for reducing the amounts of adjustment of other dependent stations.

In this second embodiment, the most downstream station is the black station for limiting the detection errors of the mark detectors 5 and 6, but even if another color station, such as the cyan, magenta or yellow stations, might be set as the most downstream station, the same effects will be obtained as with the black station as the most downstream.

As described above, in the present embodiment among a plurality colors of registration marks which are transferred on the transporting body, the registration marks which are formed by the most downstream station are selected as the standard registration marks, and the detected timing of the standard registration marks is compared to that of other registration marks. In accordance with differences therebetween, the starting position of image formation, the angle of the scanning line and the magnification of the image formed by other image forming stations other than the most downstream station are corrected.

Therefore, the standard marks does not pass through other stations so that the standard marks are not broken by contacting or rubbing with the image forming elements. Thus, the standard marks are not mixed, nor are they changed in shape because of rubbing. The most downstream station is positioned near the driving source (motor, etc.) for the transporting belt, so that the speed of the transporting belt is most stable. Thus, the registration marks formed on the image forming body of the most downstream station can be transferred onto the transporting body most stably, and the size of the standard marks does not change.

Further, in the present embodiment, the standard marks are colored black so that the detector 5 and 6 can easily detect them without detection errors.

Accordingly, the standard marks can be detected accurately, the images by the all stations can be superimposed accurately, and high quality color images can efficiently be obtained.

In the first embodiments, the registration marks formed by the most upstream station are used as a standard, and in subsequent embodiments, the registration marks formed by the most downstream station are used as a standard.

Figure 19A:
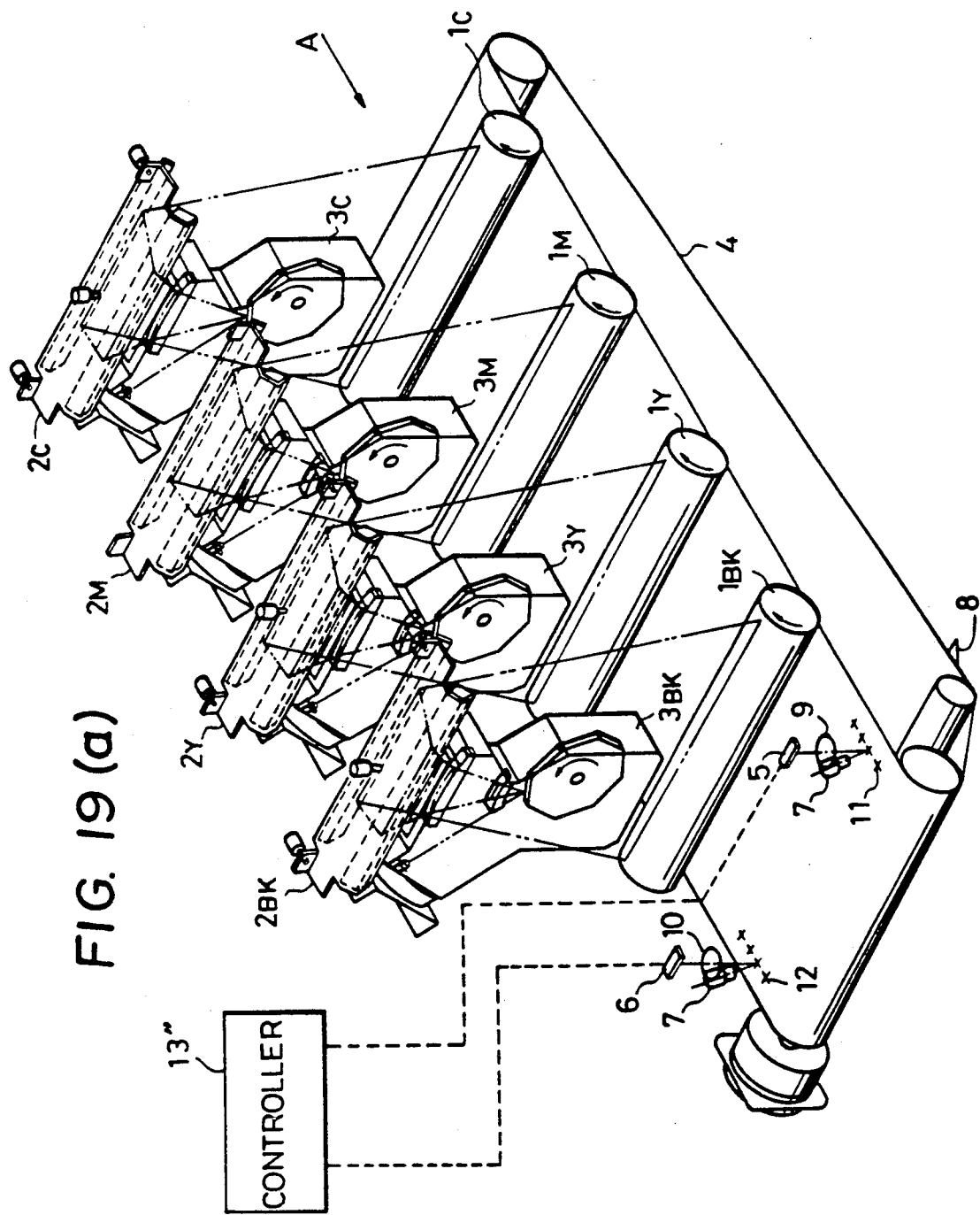
FIG. 19(a) is a perspective view showing a third embodiment of the present invention.

But in a further embodiment, which is explained as follows, the registration marks formed by a station which is not the most upstream or the most downstream station of the transportation belt are used as a standard. As shown in FIG. 19(a), in the magenta image forming station the photosensitive drum 1M, the optical mirror 2M and the optical scanner unit 3M are installed in fixed position at the time of assembly, there being provided no adjusting equipment as explained with reference to FIG. 2.

On the other hand, other image forming stations have adjusting equipment for enabling movement of the photosensitive drums 1C, 1Y and 1BK, the optical mirrors 2C, 2Y and 2BK, and the optical scanners 3C, 3Y and 3BK.

Differences between this and the prior embodiments are which station is standard, and which stations should be adjusted. The standard station in the present embodiment operates as same as that in the prior embodiments, and the adjustable station in the present embodiment functions in the same way as that in the prior embodiments.

A controller 13" operates in the same way as the controller 13 in FIG. 1(a). Namely the controller 13" detects differences between detection timing of magenta registration marks and that of the registration marks of other colors. The controller 13" adjusts the optical path, the magnification and the inclination of the scanning beam from the optical scanners 3C, 3Y and 3BK so as to cause the position of cyan, yellow and black scanning lines to coincide with that of the magenta scanning line in accordance with the differences detected by the controller 13".

The reason why the station which is neither the most upstream nor the most downstream station relative to the transportation belt may be selected as the standard station for the adjustment is as follows:

In a four drum color printer like the present embodiment a driving source for driving the transportation belt 4 is ordinarily installed at the most downstream position in the transporting direction of the belt 4. The belt 4 made of polyimide or polyurethane may especially be subject to change of elasticity, spread, stepping aside and floating in a mixed manner. It is very difficult for the entire surface of the belt 4 to be transported always with a predetermined speed. However, the area of the belt near to the driving source can almost transported with an ideal speed.

In the most downstream station, in this case the black station, the belt 4 is transported most stably. The registration marks which are transferred at the black station are formed with most ideal size.

Further the registration marks, which are formed at stations other than the black station, may be broken by contacting or rubbing with the image formation element when the marks pass through subsequent station. But the most downstream station does not have any subsequent station, whereby the registration marks made by the most downstream station would not be broken, would not be mixed with other colors, and would not have separation of the mark.

On the other hand, to correct the misregistration in response to positions of the registration marks, as described above, the standard marks should be printed accurately, should be transferred accurately in the standard station, and should be detected accurately by the detectors 5 and 6.

In a four drum color printer like this embodiment, the transferring material S is sent to the printing station by A registration rollers which are provided for synchronizing the top of the material with the top of the image on the drum at the transferring station.

Image writing on the photosensitive drums 1C, 1M, 1Y and 1BK starts based on the beginning of the isolation of the registration rollers.

Therefore, the most upstream station which is positioned closest to the registration rollers writes registration marks most precisely.

The more distant from the registration rollers, the less precise the mark recording position because it takes much time after the registration rollers start rotation until the station processes transferring. Therefore, if the speed of the transportation belt 4 changes during this period, the transferring time of the registration marks changes and it is impossible to write the registration marks on the predetermined positions.

In order to prevent these particular disadvantages, the standard registration marks should be formed by the most upstream station which is the closest station to the registration rollers (in this embodiment, the closest station is the cyan station), as explained above.

However, as also explained above, the cyan marks have to pass through the three subsequent stations before the detectors detect them so that the cyan marks might be rubbed when they pass the image transferring parts between the photosensitive drums and the transportation belt. Thus, the detectors 5 and 6 fail to read the cyan marks accurately, and the misregistrations might be bigger if the correction is performed in accordance with mispositioned registration marks.

However, the amount of movement of the registration marks of the downstream station, that is of the magenta or yellow station, is smaller than that of the most upstream station.

The cyan marks formed by the most upstream station are fixed on the transportation belt 4 by passing through subsequent stations. Therefore, the detectors 5 and 6 read most stably the cyan marks among the four color marks which are transferred at the most upstream station. But, the occurrence of rubbing, which is described above, can not be discounted, and there is the possibility that such rubbing will prevent the stable reading of the marks.

Therefore, in the present embodiment, to obtain the advantages of using the upstream side station and downstream side station as the standard, and to set off the disadvantages of using the upstream side and downstream side station as the standard, a middle stream station which is neither the most upstream nor the most downstream station is used as the standard station, and in this embodiment the magenta station is selected as the standard station. The registration marks formed by the middle stream station are then standard for adjustment of the misregistration.

Figure 20B:
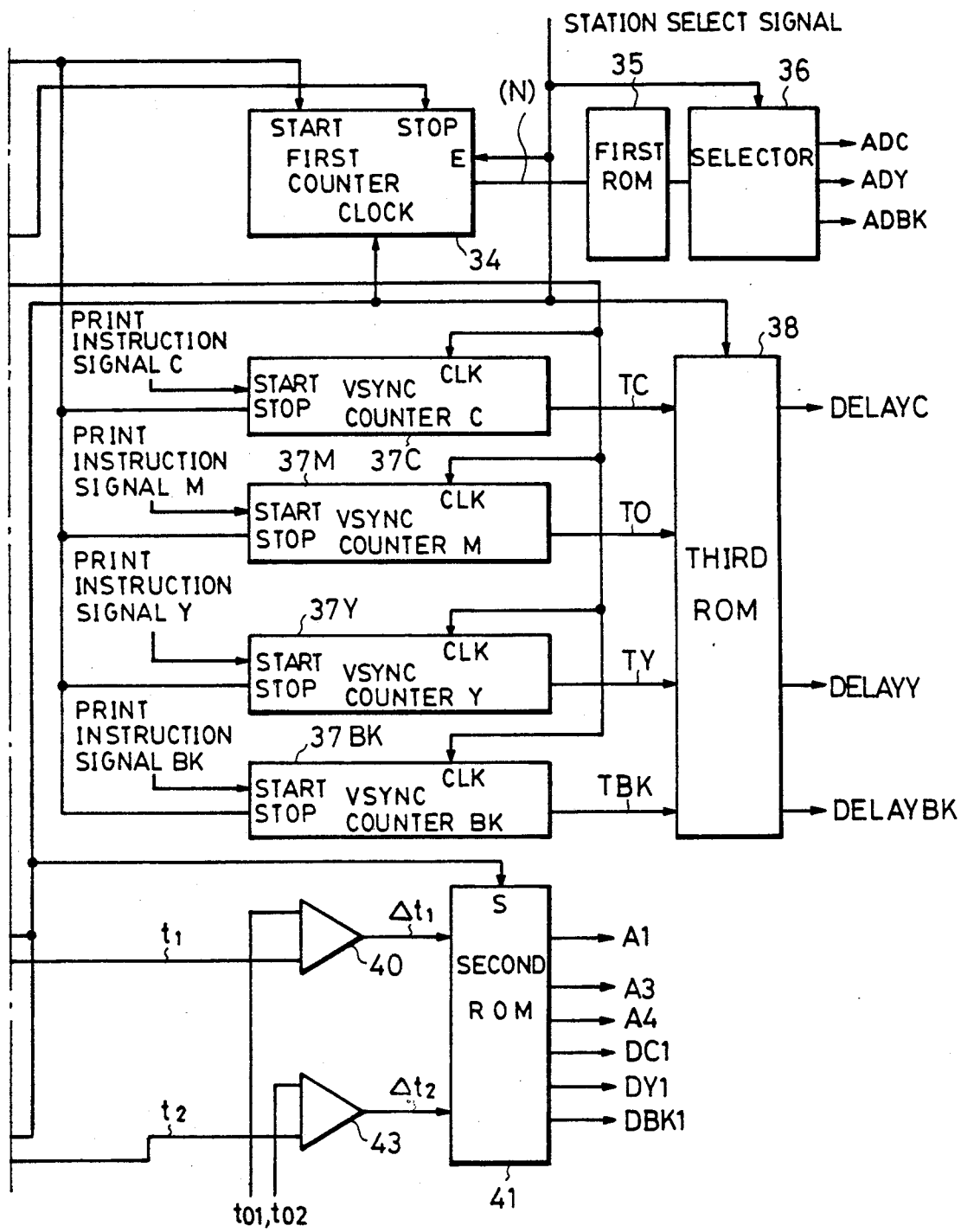

FIG. 20 shows a control block diagram of the controller 13" in FIG. 19(a), and is substantially similar to that of FIG. 4. But, since the magenta marks are used as standard, the first ROM35", the second ROM41" and the third ROM38" output control signals for cyan, yellow and black stations.

Namely, the controller 13" detects the standard data for the top margin, the left margin, the inclination of the scanning line and the magnification in accordance with the detection output of the magenta marks, and adjusts the cyan, yellow and black stations in response to the differences between the standard data and other detection data which are obtained when the controller 13" detects other color marks.

Again, by the way, all variations and modifications shown in the first embodiment can be applied to the third embodiment.

Figure 19B:
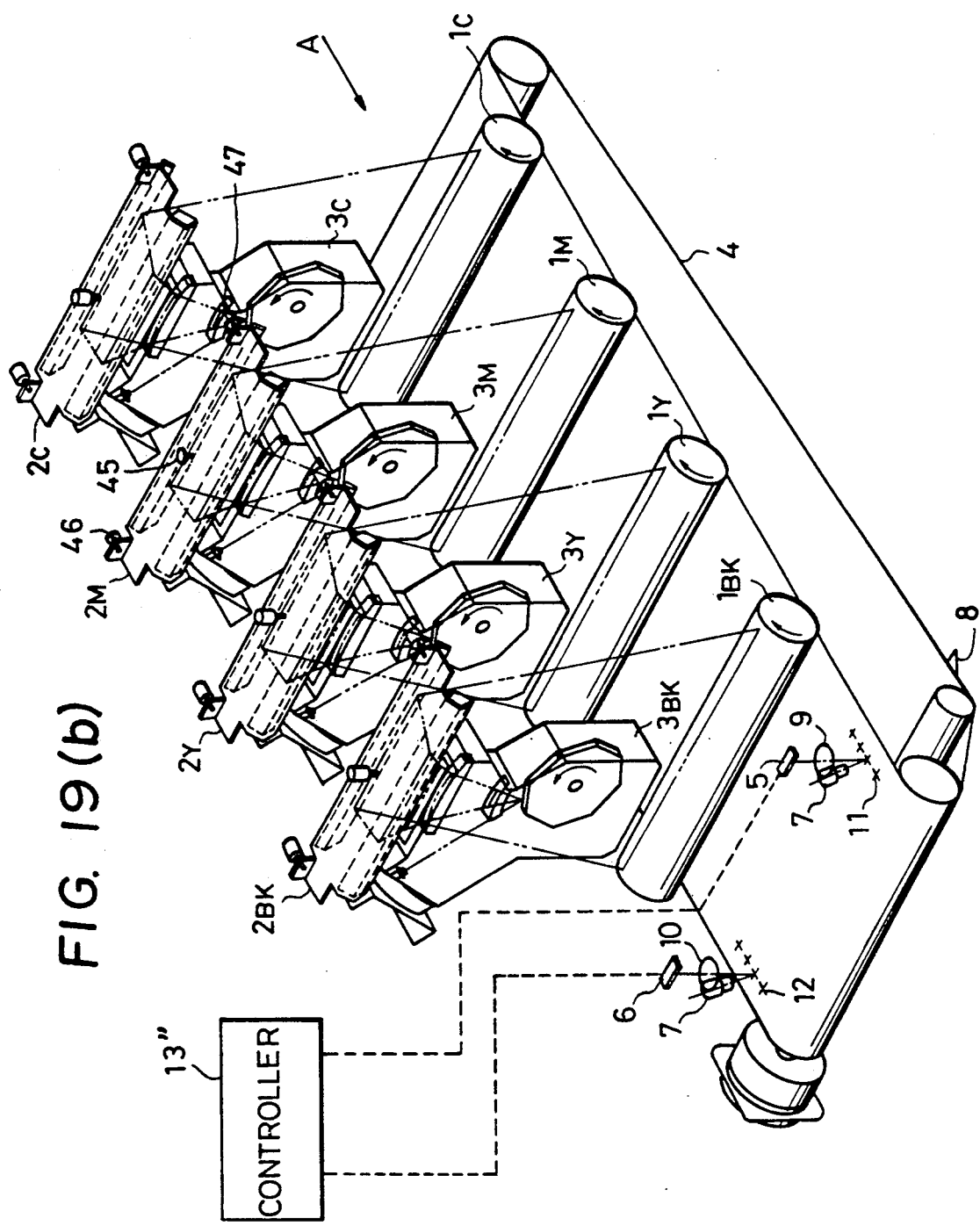
FIG. 19(b) is a perspective view showing another embodiment of the present invention.

For example, as shown in FIG. 19(b), manual adjusting screws 45 through 47 may be arranged at positions in the magenta station corresponding to the actuators 25 through 27 to maintain the apparatus in desired position and to reduce the amounts of automatic adjustment.

As shown in FIG. 1(c), actuators 25 through 27 may be arranged at the magenta station in order to maintain the apparatus at desired position, to reduce the amounts of adjustment and to intentionally and automatically adjust the standard station for reducing the amounts of adjustment of other dependent stations.

In present embodiment, the developing color of the standard station which is a middle stream station is selected to the magenta for limiting the detection error. But, the developing color of the middle stream station is not restricted to magenta, since other colors, cyan, yellow or black might be used.

As described above, in the present embodiment, among a plurality of colors of registration marks which are transferred on the transporting body, the registration marks formed by the middle stream station which is not the most upstream or the most downstream station are selected as the standard marks, and the detection timing of the standard marks is compared with that of other registration marks. In accordance with differences therebetween, the starting position of image formation, the angle of the scanning line and the magnification of the image of other image forming stations are corrected or adjusted. Accordingly, elements of instability which can be generated at the timing of detecting the marks are prevented and, it is possible to detect the registration marks accurately.

Compared to adjustments by the standard marks formed by the most upstream or the most downstream station, this embodiment has certain advantages of its own, which might be considered improvements on the advantages of the prior embodiments.

Therefore, the misregistrations can be corrected accurately, the images by all of the stations can be superimposed accurately, and high quality color images can efficiently be obtained.

A still further embodiment is explained as follows.

Figure 21A:
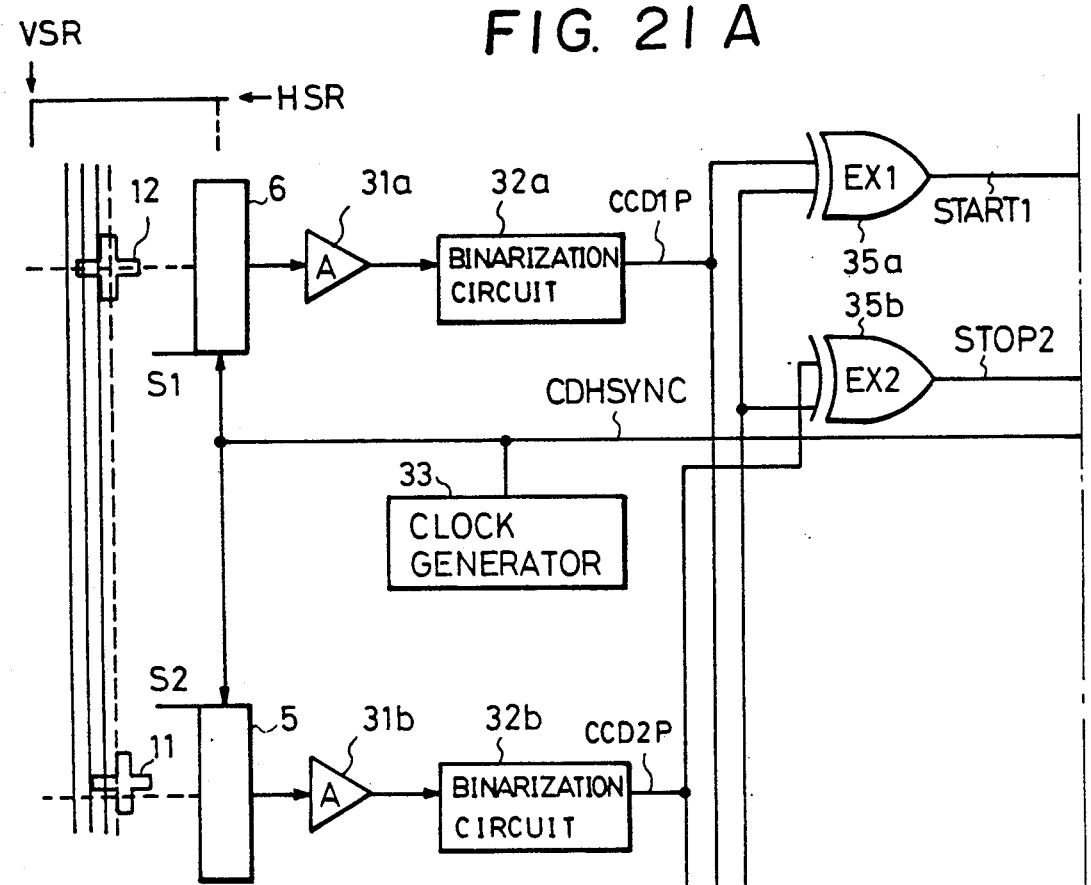
FIGS. 21A and 21B, is a block diagram of another controller in accordance with the present invention.
Figure 21:
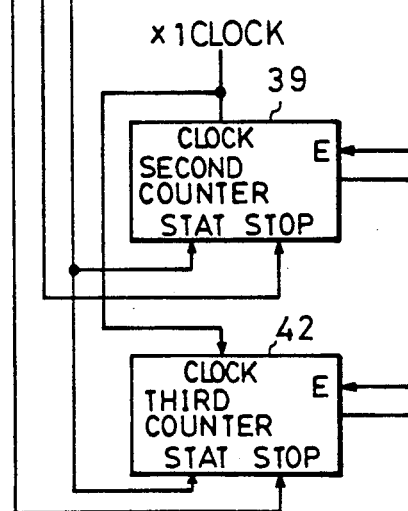
FIG. 21, comprising
Figure 21B:
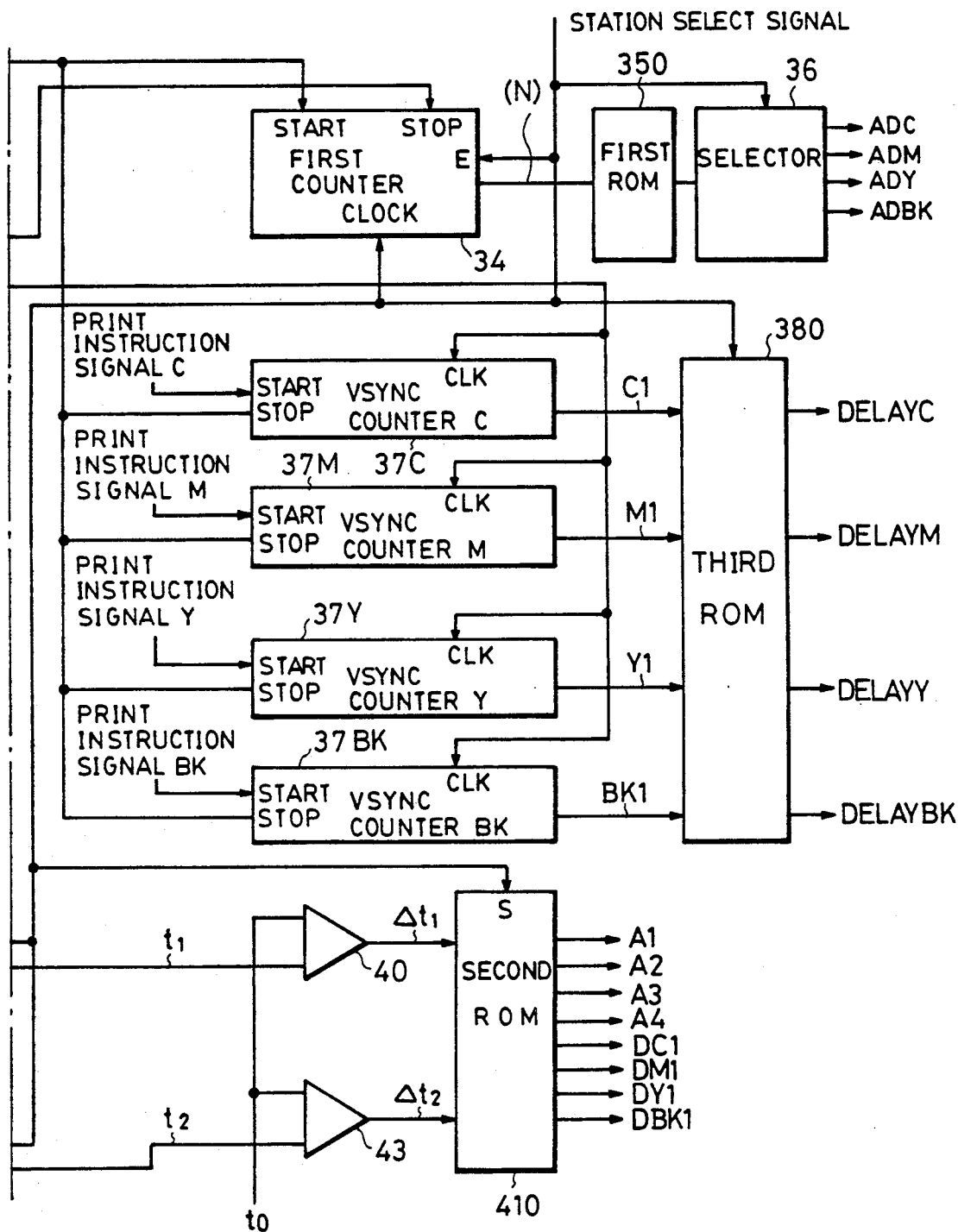

In the fourth embodiment, as shown in FIG. 1(c), every image forming station has actuators such as are shown in FIG. 2, and the misregistrations of each station can be adjusted to the ideal condition rather than to a condition of a predetermined standard station like the prior embodiments. FIG. 21 shows an internal circuit diagram of a controller 130 of this embodiment.

FIG. 21 corresponds to FIG. 4, FIG. 18 and FIG. 20, and the circuit of FIG. 21 is structured such that all stations can be adjusted to reduce the misregistrations.

In FIG. 21, the same elements as those shown in FIG. 4 have the same identification numbers.

The controller 130 controls actuators which adjust the length of the optical path between the optical scanners 3C, 3M, 3Y and 3BK and the photosensitive drums 1C, 1M, 1Y and 1BK, the length of the scanning line and the inclination of the scanning line, in accordance with the differences between real detection timings obtained from the detectors 5 and 6 and predetermined detection timings which are previously stored. The controller 130 also matches the detection timing of the marks 11 and 12 from the detectors 5 and 6, prohibits actuators from then starting those adjustments of each station when the detection timings obtained from the detectors is not within permissible limits which are previously set. The stations which are prohibited from starting adjustment is arranged to reform the registration marks again. Then the controller 130 controls actuators to adjust the reforming station in accordance with the differences between the redetection timings and the predetermined set timings.

Figure 22:
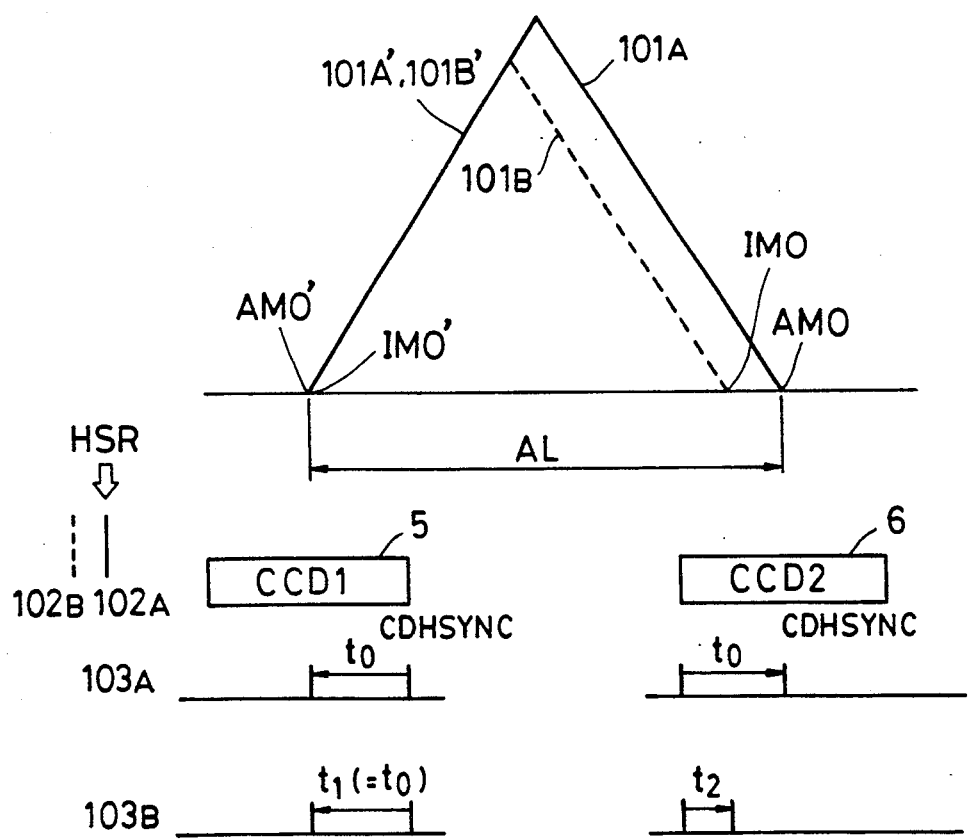
FIG. 22 and FIG. 23 are time charts explaining a reading operation of registration marks in an embodiment of the present invention.
Figure 23:
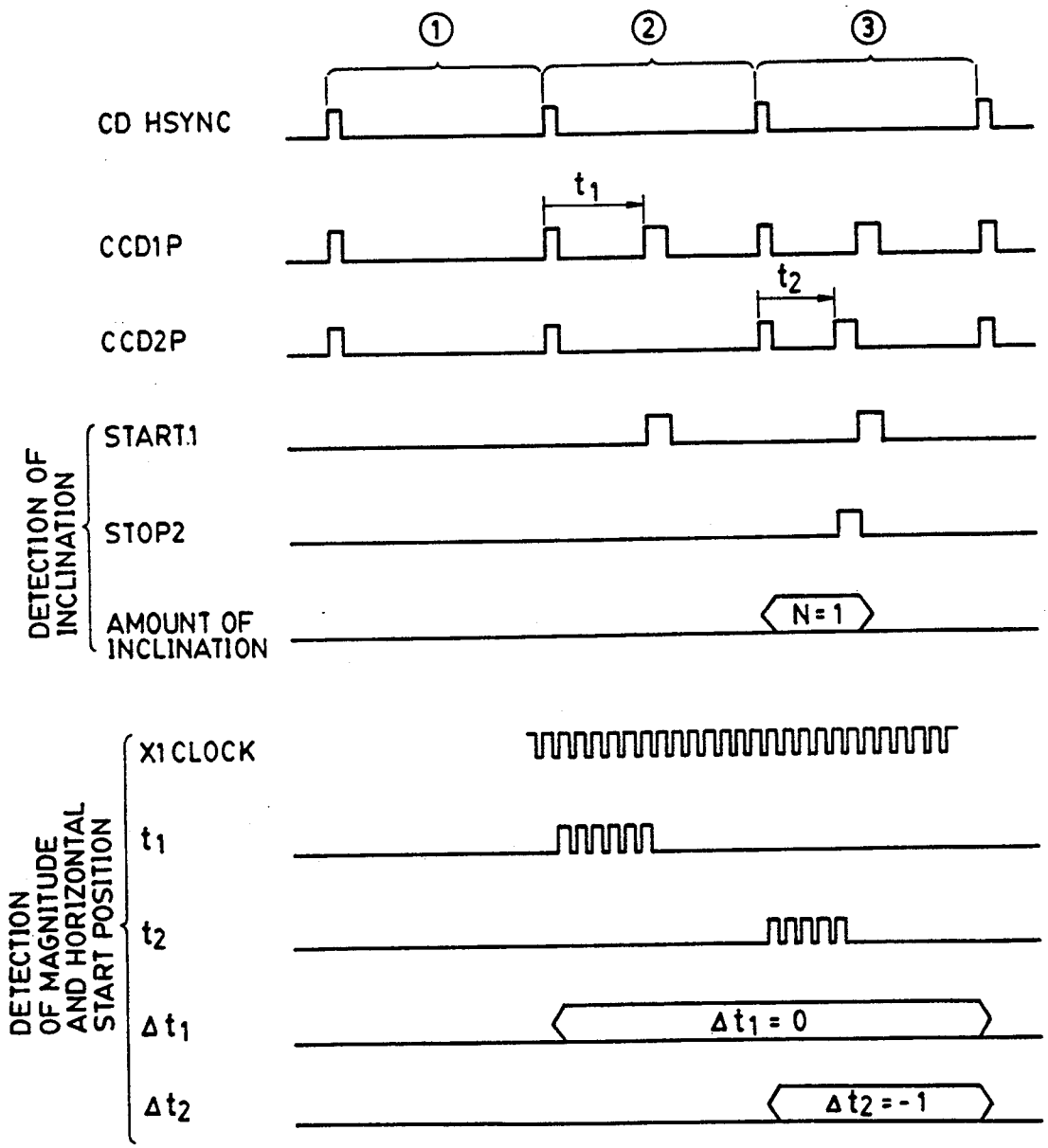

Referring to FIG. 22 and FIG. 23, operation of the controller 130 shown in FIG. 21 is explained as follows.

In FIG. 21, 22 and 23, the same elements in the prior embodiment have the same identifications members. FIG. 21 is a drawing for explaining reading operation of the mark detectors 5 and 6. In FIG. 21, a pair of scanning beams 101A and 101A' represent accurate beams that can write an accurate marks AMO and AMO'. The length AL of accurate scanning line between two accurate marks AMO and AMO' is a standard length. On the other hand, a pair of scanning beam 101B and 101B' may write irregular registration marks IMO and IMO', which might be written by one of four image forming stations. Both reading output signals 103A are provided when the mark detectors 6 and 5 read the accurate marks AMO' and AMO which correspond to the scanning beams 101A' and 101A'.

On the other hand, both reading output signals 103B are provided when the mark detectors 6 and 5 read the irregular registration marks 1MO' and 1MO which are made by the pair of scanning beams 101B' and 101B formed by one of the four stations.

FIG. 23 is a timing chart for explaining operations of the circuit of FIG. 21.

The output operation of the detectors 5 and 6 for the errors of magnification and for the left margin are explained as follows. The mark detectors 5 and 6 read the accurate registration marks AMO(11) and AMO'(12) and the binarization circuit 32b and 32a output signals CCD2P and CCD1P. The mark detection outputs 103A are obtained when time $t_o$ elapses after the synchronizing signal CDHSYNC is produced. But, since the mark 1MO which is read by the detector 5 is shifted from the accurate position as shown in FIG. 22, the output 103B from the mark detector 5 is obtained when time $t_2$ ($t_2 < t_0$) has elapsed after production of the synchronizing signal CDHSYNC, the output 103B from the detector 6 is obtained when time $t_1$ ($t_1 = t_0$) elapse after the signal CDHSYNC. Therefore the magnification of the image formed by the beams 101B, 101B' is smaller than by the accurate beams 101A, 101A', and the standard position of the left margin of the image by the beams 101B, 101B' is shifted from the accurate standard position 102A to 102B.

The horizontal periods 1, 2 and 3 in FIG. 23 respectively coincide with the scanning lines 1, 2 and 3 in FIG. 21. Of course there may be more than three scanning lines. The detectors 6 and 5 read the marks 12 and 11 sequentially and in rapid succession scanning lines 1, 2, 3, in synchronizm with the horizontal synchronizing signal CDHSYNC (FIG. 21), and the binary imaging signals CCD1P and CCD2P ar output from the binarization circuit 32a, 32b in response to such reading.

In the case shown in FIG. 21, the detectors 6 and 5 first read the scanning line 1, where no registration mark is printed, so that the signals CCD1P and CCD2P do not indicate any mark detection.

Then, as shown in FIG. 21, the detectors 6 and 5 read the scanning line 2 where only the registration mark 11 appears, so that the signal CCD1P constitutes a mark detecting signal at the time $t_1$ ($=t_0$) from the detector 6. However, the mark 12 does not appear at scanning line 2 or scanning period 2 so that the signal CCD2P does not indicate any mark detection.

Thereafter, the imaging devices 6 and 5 read scanning line 3 during scanning period 3 where the registration marks 12 and 11 both appear. The binary signal CCD2P which correspond to a mark 11 constitute a mark detecting signal produced at $t_2$ ($<t_0$) from the detector 5.

In accordance with those binary signals CCD1P and CCD2P from the binarization circuits 32a and 32b, the second counter 39 and the third counter 42 count the times $t_1$ and $t_2$. Those count values $t_1$ and $t_2$ are provided for comparators 40 and 43. The comparator 40 compares the count value $t_1$ to a regular count value $t_0$, corresponding to the time interval $t_0$. Then the difference $\Delta t_1$ (in this case $t_1 = t_0$, $\Delta t_1 = 0$) is input to the second ROM410 as one of address signals. Similarly, the comparator 43 compares the count value $t_2$ to the regular count value $t_0$. Then the difference $\Delta t_2$ (in this case $\Delta t_2 = -1$) is also input to the second ROM410 as the other of address signal.

The second ROM410 which initially stably stores all data of control values for adjusting the magnification and those for adjusting the left margin according to the results of comparisons by comparators 40 and 43, outputs the control values A1 through A4 for adjusting the magnification which drives the actuator 25 of each station and the control values DC1, DM1, DY1 and DBK1 for adjusting the left margin which control delay times starting signal for writing from the horizontal synchronization signal HDSYNC. The station which should be controlled is sequentially selected in accordance with the selection signal which is input to the terminal S of the second ROM410.

Thus the magnifications and the left margins of all stations are corrected and caused to coincide to the accurate states.

The explanation of the adjustment of the inclination of the scanning line is as follows.

As described above, the mark detector 6 reads the mark 12 on the scanning line 2 during the period 2, and the binary signal-CCD1P from the circuit 32a is input to the one terminal of the exclusive OR gate 35a. The gate 35a produces a starting signal START1. The signal START1 is input to the starting terminal START of the first counter 34, and clock input terminals CLK of VSYNC counters 37C, 37M, 37Y and 37BK. The first counter 34 starts counting the horizontal synchronizing signal CDHSYNC in response to the signal START1.

Then, the mark detector 5 read the mark 11 on the scanning line 3 during the period 3, and the binary signal CCD2P from the circuit 32b is input to one terminal of the exclusive OR gate 35b. The gate 35b produces a stopping signal STOP2. The signal STOP2 is input to the stopping terminal STOP of the first counter 34. The first counter 34 stops counting the signal CDHSYNC in response to the signal STOP2. Thus an inclination amount Nc which represents how much the scanning line inclines is obtained from the count value of the first counter 34. The count value of the counter 34 is input to the first ROM350 as an address signal. The first ROM350 stores control values ADC, ADM, ADY and ADBK for the actuators 26 and 27 in accordance with all of the inclination data from the first counter 34.

The output control values ADC from the first ROM350 controls the actuators 26 and 27 to adjust the direction of the reflective body 24 for the cyan station.

The operation for the cyan station as described above is repeated for the other stations, namely magenta, yellow and black stations. Specifically, the station select signal is input to the selector circuit 36 and the selector circuit 36 outputs the control values ADC, ADM, ADY and ADBK to the actuators 26 and 27 of the selected station in accordance with the station select signal. The inclinations of all stations are then sequentially adjusted and corrected.

The explanation of adjustment of the top margin is as follows.

First, an explanation of the adjustment of the top margin for cyan station will be made.

The VSYNC counter 37C for the cyan station starts counting the signal CDHSYNC at the time when the print instruction signal to write the registration marks at the cyan station is generated, namely when the cyan station begins writing the marks 11 and 12 in response to inputting of the command signal into the terminal START of the counter 37C. When the mark detector 6 detects the top of the cyan mark 12, the counter 37C stops counting the signal CDHSYNC in response to the detection signal CCD1P from the binarization circuit 32b representing the detection of the mark 12. The counting value Cl of the counter 37C is input to the third ROM380.

The third ROM380 initially stores control values for correcting the top margin according to all the count values. Thus the third ROM380 outputs the correction data DELAYC.

The correction data DELAYC represents a differential value between the accurate count value when the mark is printed in its regular or accurate position and the real count value. The correction data DELAYC is used for adjusting the timing of outputting the vertical synchronizing signals, which decide the timing of starting of writing the cyan image in the vertical direction. Thus the top margin of the cyan station is adjusted or corrected. This operation is also performed for the magenta, yellow and black stations in accordance with the station select signal. Then the top margins of all stations are corrected to the accurate position.

As with the prior embodiments, also in this embodiment, each of the counters 37C, 37M, 37Y and 37BK stops counting in response to each of the detection outputs CCD1P representing the cyan, magenta, yellow and black marks 12. Therefore, for example, the circuit should be structured such that the counter 37BK does not stop counting in response to other detection outputs CCD1P representing cyan, magenta and yellow.

After the detection of all registration marks 11 and 12 by the detectors 5 and 6, the marks 11 and 12 on the transportation belt 4 are cleaned or removed by the cleaning member 8 for preparing for the next recording of the registration marks or real images.

As described above, the misregistrations, arising with the inclination of the scanning line, the top margin, the magnification and the left margin, are adjusted.

Certain errors (1) through (3) listed below may arise when the registration marks 11 and 12 are detected.

(1) It is possible to read the marks 11 and 12 inaccurately because of erroneous operations caused by electrical noise.

(2) It may not be possible to read the marks 11 and 12 because the transferring belt near the marks 11 and 12 is too dirty.

(3) Materials other than the marks 11 and 12 such as scratches on the belt 4 or foreign bodies on the belt 4 are recognized as the marks.

Therefore, it is dangerous to reproduce intentionally the color image, if the adjustment is processed under in the cases (1) through (3) described above.

Thus, a reading region for the marks should be set, when the marks are read. Then it is arranged that the adjustment for each station described above is processed only when the marks of each color are detected in the reading region.

Namely, an upper limit timing $a_1$ and a lower limit timing $a_2$ are set for each image forming station to the accurate detection timing $a_0$ of the registration marks 11 and 12 transferred on the transporting belt 4, and the timing $a_0$ is previously stored in a memory in the controller 130. When the detection timing for each station is within the period between the upper timing $a_1$ and the lower timing $a_2$ the adjustment of the corresponding station is carried out.

On the other hand, when the detection timing is not within the defined period, the adjustment of the corresponding station is not carried out. The registration marks 11 and 12 of the corresponding station are thereafter formed again and detected again. Then if the detection timing occurs within the period between $a_1$ and $a_2$, for the corresponding station the adjustments described above are processed by the the controller 130. For example, if the lower limit $a_2$ is set the timing which corresponds to misregistration of one picture element, for example, 0.15 mm, it is able to adjust the misregistration on the base of amount of minimum misregistration.

Thus, the erroneous reading caused by electrical noise should be reduced, and if the positions of the marks 11, 12 on the transporting belt 4 change to new positions in second detection process, the erroneous readings caused by the dirt or toner or scratches on the belt 4 should be reduced further.

Thus, until the registration marks 11 and 12 are detected in the predetermined region, that is in this embodiment until marks are detected within the period between the upper time $a_1$ and the lower time $a_2$, the adjustments of the station are prohibited. The greater the number of prohibitions, the less the rate for error in reading the marks. However, the above described matching process for the detecting timing is performed immediately before the image formation or during the image formation. Therefore, the number of detections should be limited. Namely, in the second or third detection even if the detection timing a is not within the period between $a_1$ and $a_2$, the above-described adjustments are performed. Thus, the processes are completed in the minimum time.

In the apparatus which carries out the above described adjustments during the rest state, that is, non-image forming state, such as a pre heating state, there is no time limitation. Therefore, in such an apparatus, until the detection timing is within the period between $a_1$ and $a_2$, the adjustments are prohibited and the matching process is continuing for a predetermined time. If the detection timing is not within the period between $a_1$ and $a_2$ in the predetermined time, a warning is displayed or otherwise indicated on the operational panel of the image forming apparatus, and the apparatus should be stopped until a repair is performed. Then, the apparatus can always make color copies in the best condition. By the way, after the detection timing is within the period between $a_1$ and $a_2$ in the matching process, the image forming sequence is carried out.

Figure 24:
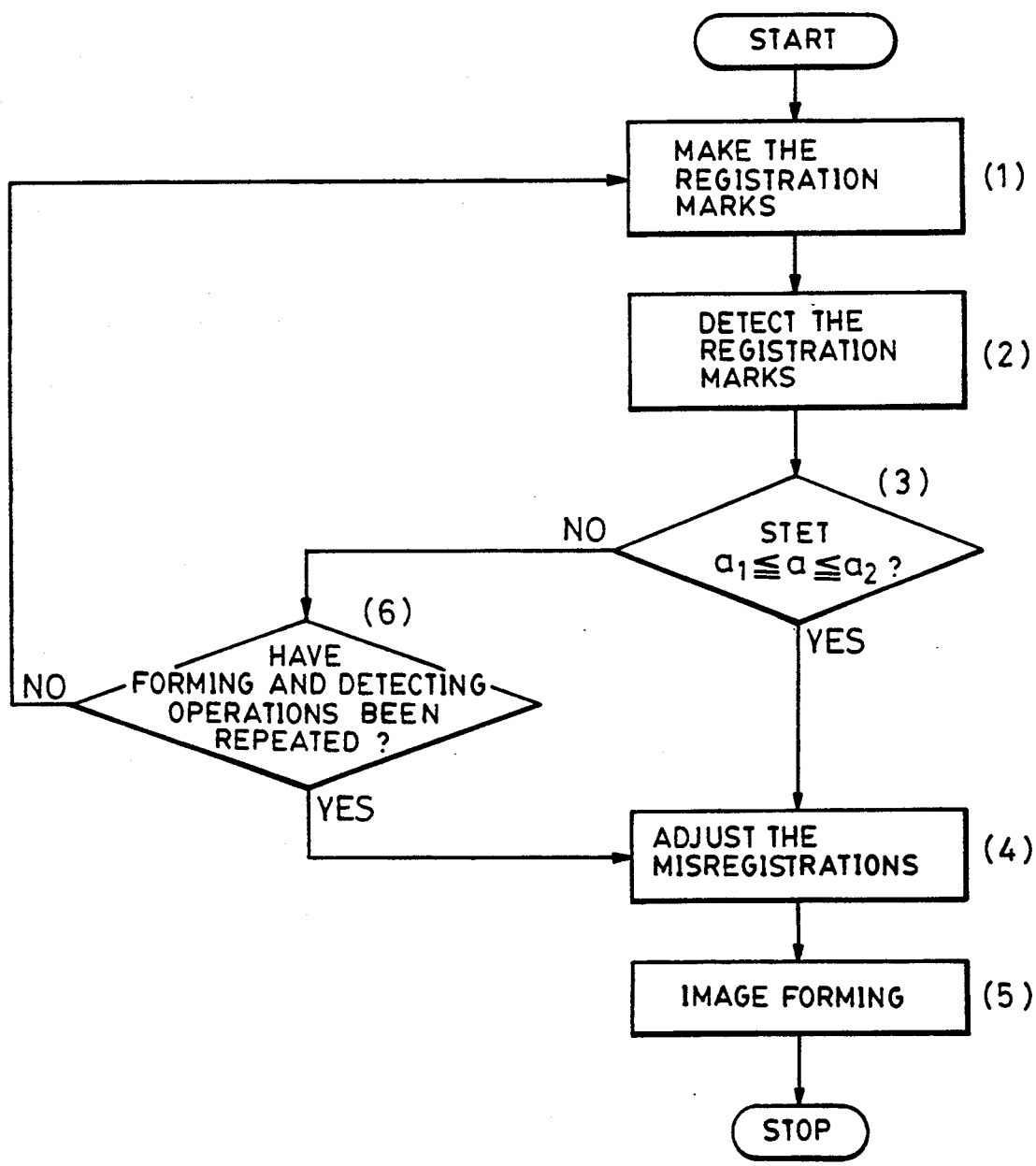
FIG. 24 is a flow-chart showing a control operations for reading registration marks, correction of misregistrations and image forming.

Referring now to FIG. 24, control operations for adjustment are explained as follows. FIG. 24 shows a flowchart showing an example of the control operations for adjustment. In FIG. 26, (1) through (6) show steps for such control.

In a step (1), the controller 130 causes the image forming station to make the registration marks on the drums 1C, 1M, 1Y and 1BK, and then these marks are transferred on the transporting belt 4.

In a step (2), the detectors 5 and 6 detect the marks 11 and 12.

In a step (3), it is discriminated whether the detection timing of the image signals CCD1P and CCD2P is within the period between the upper limit $a_1$ and the lower limit $a_2$. If the detection timing is within the period, the adjustments of the inclination of the scanning line, the top margin, the magnification and the left margin are carried out in a step (4). Then, after the adjustments are completed, the image forming operations are carried out in a step (5).

On the other hand, if the detection timing is not within the period in step (3), a step (6) is performed.

In the step (6), it is discriminated whether the forming and detecting operations have been already repeated. Then if the operations have been repeated, step (4) is performed. If not, namely the operations have performed only once, step (1) is carried out, and the operations of forming and detecting marks are repeated.

By the way, in this embodiment, if on any station the detection timing is not within the permissible period, the adjustments for all stations are prohibited. However, it may be structured that the adjustments is performed for the stations where the detection timing is within the permissible period and the adjustments are prohibited for the stations where the detection timing is not within the permissible period. According, the adjustments can be completed in less time.

And, in this embodiment, the mark detectors 5 and 6 detect the marks 11 and 12. Then four information, namely, the top margin, the left margin, the inclination and the magnification, are obtained. In accordance with the detection timing, all adjustments are prohibited together. However, it may be structured that the permissible region is set for each of the four types of information, and that the adjustments are prohibited for the misregistrations which are not within the permissible region. Accordingly, the adjustment can be performed in accordance with the level of importance of misregistrations which affect respective color image divergence.

Further, in this embodiment, the mark detectors 5 and 6 detect the relative divergence of the positions of the marks 11 and 12, and in accordance with the amount of the relative divergence, the misregistrations, the top margin, the magnification, the left margin, and the inclination, are adjusted all together. It may be structured that, assuming the divergence during the first time the adjustment is carried out for $\Delta t/n$, wherein n is a natural number, e.g., 2 or 3), the adjustments are repeated such that the divergence $\Delta t$ gradually becomes 0. Sometimes the detection output is false. If the false detection output is applied to the correction control, the amount of the divergence based on the false detection appears to be corrected but in fact is not. Therefore, there is the possibility that the divergence will become large even though correction appears to have been performed. If the detection timing diverges not by the mechanical accuracy but by other causes, adjustments are limited being performed and it can be prevented that the amount of misregistrations increase because of error detection. Therefore, the adjustments are always performed only in accordance with the mechanical structure.

By the way, the variations discussed with reference to FIG. 7 through FIG. 16 and described in this specification can also be applied to the last embodiment described above. And, prohibition of adjustment when the detection timing is not within the permissible period can be applied to the prior embodiments where the adjustments are performed such as to cause the scanning line of each station to coincide with the predetermined one standard station.

As described above, the embodiments of the present invention can have means for prohibiting the adjustments of the starting points of the light beam on the image holding medium, the angle of the light beam on the medium and the accuracy. Then, high quality color images which have no color divergence can be formed, even if the registration mark is failed to be detected accurately because of the certain errors (1) through (3).

In these embodiments, electrophotographic color printers are explained. But, the present invention can be adapted to other types of printers such as transfer type printers. And, the present invention can be adapted to a two color printer, a three color printer, a five or more color printer, or a mono color printer, if such printer makes a superimposed image.

As described above, an image forming apparatus of the present invention can make high quality super imposed images without misregistration.

The image forming apparatus of the present invention can detect registration marks without errors.

Further, the image forming apparatus of the present invention can shorten the time needed to adjust for misregistrations.

Although particular embodiments of the present invention are herein disclosed for purposes of explanation, various modifications thereof, after study of this specification, will be apparent to those skilled in the art to which the invention pertains, and will be included in the present invention.

What is claimed is:

1. An image forming apparatus for forming superimposed images, comprising:
   a plurality of image holders each respectively for holding an image;
   a plurality of image forming mean each respectively for forming an image on one said image holder;
   a moving member for assisting in transfer of the images formed on said image holders to another medium; and
   adjusting means for adjusting positions of images formed on said image holders by said image forming means except the position of images formed on the image holder most downstream relative to the direction of movement of said moving member, said adjusting being based on a position of the image on said most downstream image holder, to correct misregistration of the formed images on each of said image holders.

2. An image forming apparatus according to claim 1, wherein said moving member has a region for receiving a recorded registration mark, wherein said adjusting means has a detector for detecting the registration mark recorded at said region and for producing a detection signal representing the detection, and wherein said adjusting means adjusts said positions of images formed on said image holders on the basis of said signal.

3. An image forming apparatus according to claim 2, wherein said detector has a plurality of detecting members, and wherein said plurality of detecting members are arranged substantially at a right angle to the direction of movement of said moving member.

4. An image forming apparatus according to claim 1, wherein said moving member comprises image holding paper for directly receiving each of the plurality of images.

5. An image forming apparatus according to claim 1, wherein said moving member comprises continuous image holding paper which can be transported continuously.

6. An image forming apparatus according to claim 1, wherein said moving member comprises an image transferring medium for temporarily holding each of the plurality of images.

7. An image forming apparatus according to claim 1, wherein each said image forming means has a beam generator for generating a light beam and a scanner for scanning said light beam, and wherein each said image forming means forms the image on said image holder by using the beam scanned by the scanner.

8. An image forming apparatus according to claim 7, wherein said adjusting means adjusts the position of said scanner.

9. An image forming apparatus according to claim 8, wherein said scanner has a mirror, and said adjusting means adjusts the position of said mirror.

10. An image forming apparatus according to claim 7, wherein said adjusting means adjusts a scanning angle of the light beam.

11. An image forming apparatus according to claim 7, wherein said adjusting means adjusts a length of scanning the light beam.

12. An image forming apparatus according to claim 7, wherein said adjusting means electrically adjusts a start timing of writing by the light beam.

13. An image forming apparatus according to claim 12, wherein said adjusting means adjusts the start timing of writing by the light beam in a scanning direction of the light beam by said scanner.

14. An image forming apparatus according to claim 12, wherein said adjusting means adjusts the start timing of writing by the light beam in a direction which is substantially perpendicular to a scanning direction of the light beam by said scanner.

15. An image forming apparatus according to claim 7, wherein said adjusting means adjusts a position of at least one of said plurality of image holders.

16. An image forming apparatus for forming superimposed images, comprising:
   a plurality of at least three image holders each respectively for holding an image;
   a plurality of image forming means each respectively for forming an image on one said image holder;
   a moving member for assisting in transfer of the images formed on said image holders to another medium; and
   adjusting means for adjusting positions of images formed on said image holders by said image forming means, except the position of the image found on one said image holder which is not positioned in either of the most upstream or the most downstream location relative to said moving member, said adjusting being based on a position of the image on said one image holder, to correct misregistration of the images on each of said image holders.

17. An image forming apparatus according to claim 16, wherein said moving member has a region for receiving a recorded registration mark, wherein said adjusting means has a detector for detecting the registration mark recorded at said region and for producing a detection signal representing the detection, and wherein said adjusting means adjusts said positions of images formed on said image holders on the basis of said signal.

18. An image forming apparatus according to claim 17, wherein said detector has a plurality of detecting members, and wherein said plurality of detecting members are arranged substantially at a right angle to the direction of movement of said moving member.

19. An image forming apparatus according to claim 16, wherein said moving member comprises image holding paper for directly receiving each of the plurality of images.

20. An image forming apparatus according to claim 16, wherein said moving member comprises continuous image holding paper which can be transported continuously.

21. An image forming apparatus according to claim 16, wherein said moving member comprises an image transferring medium for temporarily holding each of the plurality of images.

22. An image forming apparatus according to claim 16, where each said image forming means has a beam generator for generating a light beam and a scanner for scanning said light beam, and wherein each said image forming means forms the image on said image holder by using the beam scanned by the scanner.

23. An image forming apparatus according to claim 22, wherein said adjusting means adjusts the start timing of writing by the light beam in a direction which is almost perpendicular to a scanning direction of the light beam by said scanner.

24. An image forming apparatus according to claim 23, wherein said scanner has a mirror, and said adjusting means adjusts the position of said mirror.

25. An image forming apparatus according to claim 22, wherein said adjusting means adjusts a scanning angle of the light beam.

26. An image forming apparatus according to claim 22, wherein said adjusting means adjusts a scanning length of scanning by the light beam.

27. An image forming apparatus according to claim 22, wherein said adjusting means adjusts electrically a starting timing of writing by the light beam.

28. An image forming apparatus according to claim 27, wherein said adjusting means adjusts the start timing of writing by the light beam in the direction of scanning by the light beam by said scanner.

29. An image forming apparatus according to claim 22, wherein said adjusting means adjusts a position of at least one of said plurality of image holders.

30. An image forming apparatus according to claim 22, wherein said adjusting means adjusts the position of said scanner.

31. An image forming apparatus for forming superimposed images, comprising:
   a plurality of image holders each respectively for holding an image;
   a moving member for assisting in transfer of the images formed on said image holders to another medium, said moving member having a region for receiving a recorded registration mark;
   a detector for detecting the registration mark and for producing a detection signal; and
   adjusting means for defining a permissible extent within which the registration mark may be detected and for adjusting positions of the images on said image holders in accordance with the detection signal when the detection signal is produced within the permissible extent.

32. An image forming apparatus according to claim 31, further comprising means for recording a registration mark corresponding to each of said image holders.

33. An image forming apparatus according to claim 32, wherein if any registration marks are not detected within the permissible extent by said detector, said any registration marks are recorded again by said registration mark recording means.

34. An image forming apparatus according to claim 32, wherein if no registration marks are detected within the permissible extent by said detector, all said registration marks are recorded again by said registration mark recording means.

35. An image forming apparatus according to claim 31, wherein if a detection signal is not produced within the permissible extent for a predetermined time, said adjusting means adjusts the positions of the images in accordance with last detection signal produced by detector.

36. An image forming apparatus according to claim 31, wherein if the detection signal is not produced within the permissible extent for a predetermined time, said adjusting means stops operation of said apparatus.

37. An image forming apparatus for forming superimposed image, comprising:

a plurality of image holders each respectively for holding an image;
a plurality of image forming means each respectively for forming an image on one said image holder;
means for selecting at least one of said plurality of image forming means for use; and
adjusting means for adjusting positions of images on said image holders which are formed by the image forming means selected by said selecting means to correct misregistration of the images formed by the image forming means selected by said selecting means.

38. An image forming apparatus according to claim 37, wherein said plurality of image forming means respectively form different color images on corresponding image holders, and wherein said adjusting means adjusts the position on said image holders in accordance with color information which represents color of images formed by said image forming means selected by said selecting means.

39. An image forming apparatus according to claim 38, wherein when the color of said selected image forming means is a single color, said adjusting means is disabled.

40. An image forming apparatus according to claim 37, wherein said adjusting means adjusts the positions of images based on an image on one of said image holders.

* * * * *